United States Patent
Lehn et al.

(10) Patent No.: US 11,217,996 B2
(45) Date of Patent: Jan. 4, 2022

(54) ON-BOARD BIDIRECTIONAL AC FAST CHARGER FOR ELECTRIC VEHICLES

(71) Applicants: THE GOVERNING COUNCIL OF THE UNIVERSITY OF TORONTO, Toronto (CA); HAVELAAR CANADA INDUSTRIAL R & D LABORATORY LTD., North York (CA)

(72) Inventors: Peter Lehn, Toronto (CA); Theodore Soong, Toronto (CA); Philippe Gray, Stouffville (CA); Sepehr Semsar, Thornhill (CA)

(73) Assignees: THE GOVERNING COUNCIL OF THE UNIVERSITY OF TORONTO, Toronto (CA); ELEAPPOWER LTD., Toronto (CA)

( * ) Notice: Subject to any disclaimer, the term of this patent is extended or adjusted under 35 U.S.C. 154(b) by 38 days.

(21) Appl. No.: 16/755,831

(22) PCT Filed: Oct. 12, 2018

(86) PCT No.: PCT/CA2018/051292
§ 371 (c)(1),
(2) Date: Apr. 13, 2020

(87) PCT Pub. No.: WO2019/071360
PCT Pub. Date: Apr. 18, 2019

(65) Prior Publication Data
US 2020/0280190 A1    Sep. 3, 2020

Related U.S. Application Data

(60) Provisional application No. 62/572,120, filed on Oct. 13, 2017.

(51) Int. Cl.
*H02J 3/32* (2006.01)
*H02J 50/10* (2016.01)
(Continued)

(52) U.S. Cl.
CPC ............ *H02J 3/322* (2020.01); *B60L 53/122* (2019.02); *B60L 58/12* (2019.02); *H02J 50/10* (2016.02)

(58) Field of Classification Search
CPC .......... H02J 3/322; H02J 50/10; H02J 7/1423; H02J 7/24; H02J 7/02; B60L 58/12; (Continued)

(56) References Cited

U.S. PATENT DOCUMENTS

| 8,847,555 B2 | 9/2014 | Loudot et al. |
| 2008/0180058 A1* | 7/2008 | Patel ...................... B60L 53/22 320/109 |

(Continued)

FOREIGN PATENT DOCUMENTS

| CN | 102104280 A | 6/2011 |
| CN | 102712262 A | 10/2012 |

(Continued)

OTHER PUBLICATIONS

G. Pellegrino, E. Armando, and p. Guglielmi, "An integral battery charger with power factor correction for electric scooter," IEEE Transactions on Power Electronics, vol. 25, No. 3, pp. 751-759, 2010.

(Continued)

*Primary Examiner* — Paul Dinh
(74) *Attorney, Agent, or Firm* — Norton Rose Fulbright Canada LLP

(57) ABSTRACT

An electric vehicle fast charger and methods thereof are described, adapted for re-use of magnetic components of an electric vehicle having traction converters when the electric (Continued)

vehicle is stationary and connected to a power grid. A switching stage provided by one or more sets of switches is controlled complementarily with the switches of the traction converters to (i) provide inversion of a grid voltage and (ii) shape current of the grid current between the electric vehicle and the power grid to track a waveshape of the grid voltage. A single switching stage and a dual switching stage circuit are contemplated, along with switch controller circuits, and instruction sets for switch control. Variants provide for energy transfer to accommodate for energy imbalances between storage devices.

20 Claims, 27 Drawing Sheets

(51) Int. Cl.
   *B60L 58/12* (2019.01)
   *B60L 53/122* (2019.01)
(58) Field of Classification Search
   CPC ........ B60L 53/122; B60L 53/24; B60L 53/22;
         B60L 55/00; Y02E 60/00; Y04S 10/126;
         Y02T 90/14; Y02T 10/70; Y02T 10/7072
   USPC ........................................................ 320/109
   See application file for complete search history.

(56) References Cited

U.S. PATENT DOCUMENTS

| | | |
|---|---|---|
| 2010/0096926 A1 | 4/2010 | King et al. |
| 2011/0254494 A1 | 10/2011 | Briane et al. |
| 2012/0249065 A1* | 10/2012 | Bissonette .............. B60L 53/52 320/109 |
| 2014/0244082 A1 | 8/2014 | Caron |
| 2016/0052383 A1 | 2/2016 | Caron |
| 2017/0015208 A1 | 1/2017 | Dunlap et al. |
| 2017/0072804 A1 | 3/2017 | Da Silva et al. |

FOREIGN PATENT DOCUMENTS

| | | |
|---|---|---|
| CN | 103730940 A | 4/2014 |
| EP | 1494343 A2 | 1/2005 |
| EP | 2364872 A2 | 9/2011 |
| JP | 2009095157 A | 4/2009 |
| WO | 2015123737 A1 | 8/2015 |
| WO | 2017101831 A1 | 6/2017 |
| WO | 2017101834 A1 | 6/2017 |

OTHER PUBLICATIONS

Canadian Intellectual Property Office (CIPO), International Search Report and Written Opinion against PCT Application No. PCT/CA2018/051292, dated Jan. 7, 2019.
Canadian Intellectual Property Office (CIPO), Examiner's Requisition against CA Application No. 3046036, dated Aug. 6, 2019.
Chinese Office Actiona nd Search Report issued in Chinese Application No. 2018800384563 dated Jan. 29, 2021.
Shi, R. et al., "Modified Dual Inverter Drive Enabling On-Board Fast Charging of Electric Vehicles", 42nd Annual Conference of the IEEE, Dec. 31, 2016.
Shi, R. et al., "Constant Current Fast Charging of Electric Vehicles Via a DC Grid Using a Dual-Inverter Drive", IEEE Transactions on Power Electronics, vol. 64, No. 9, Sep. 30, 2017.
Extended European Search Report issued in European Application No. 18866945, dated Oct. 1, 2021.

* cited by examiner

ON-BOARD BIDIRECTIONAL AC FAST CHARGER FOR ELECTRIC VEHICLES

CROSS-REFERENCE

This application is a non-provisional of, and claims all benefit, including priority to, U.S. Application No. 62/572,120, filed 13 Oct. 2017, entitled "On-board bidirectional AC fast charger for electric vehicles", incorporated herein by reference in its entirety.

FIELD

Some embodiments of the present disclosure generally relates to the field of power electronics, and more specifically, to charger technology for use with electric vehicles or other portable electronics.

INTRODUCTION

Providing electric charging with power electronics can be challenging, especially with electrically powered portable objects, such as electric vehicles (EVs) or portable generators. Electric vehicles require a significant amount of power for propulsion, control systems, entertainment systems, over a sustained period of time. Electric vehicles often have electric-vehicle batteries/traction batteries, and may be configured for high power to weight, and energy to weight ratios, with optimized power to weight ratios.

In some cases, multiple batteries are utilized, for example, to drive multiple motors. Heavy duty operation, such as for certain trucks, and other may require dual inverters as a higher voltage may be possible for use with higher voltage motors that may aid in increasing efficiency. Where higher voltages are possible, there may be potential efficiency improvements that may reduce the need for an additional motor.

Electric vehicles are desirable for, among others, promoting cleaner and more environmental friendly sources of energy for powering vehicles. However, electric vehicles have had relatively slow adoption due to limitations relating to electric vehicle technology, especially in relation to energy storage and charging. Faster charging enables more range to be obtained, and impacts the effectiveness of the electric vehicle as an everyday mode of transportation.

Chargers for electric vehicles are often very expensive as charging stations are implemented with bulky and heavy designs where dedicated electronics are required.

Accordingly, there is a desire to provide improved charger technology.

SUMMARY

An EV fast charger is described which offers a cost-effective and convenient means of charging an EV from an external power outlet (e.g., a AC power outlet, or a DC power source, according to different embodiments). The fast charger, in some embodiments, is optimized for on-board charging, for example, where the fast charger resides on or is coupled to a housing of a portable electronic device, such as an electric vehicle. The EV fast charger can charge from a single phase AC or DC power source. In some embodiments, off-board charging is also contemplated (e.g., where the charger is external to the housing).

The electric vehicle fast charger is adapted for re-using magnetic components of one or more motors of an electric vehicle having one or more traction converters having one or more traction converter switches that are not in use when the electric vehicle is stationary. In particular, the electric vehicle fast charger includes a pair of differential terminals configured for coupling to a power grid providing a grid voltage having a waveshape and frequency.

A grid current is established between the power grid and the electric vehicle fast charger. A challenge with interoperability occurs in relation to the waveform and/or frequency of the grid current, and a technical objective is to use technical mechanisms to impose (e.g., regulate) the grid current such that it has a same (or significantly similar) waveshape and/or frequency as the grid voltage.

One or more sets of switches are provided that provide a first switching stage. These switches are coupled to the power grid through the differential terminals and coupled to a corresponding energy storage device of one or more energy storage devices. In various embodiments, each set of switches can include at least one of: current uni-directional switches or current bi-directional two quadrant switches.

The fast charger includes one or more energy storage devices, each coupled to a corresponding set of switches of the one or more sets of switches and coupled to a corresponding traction converter of the one or more traction converters.

A switching controller is provided that is configured for generating gating signals that control the switches of the switching stage to either (i) provide inversion of the grid voltage, or (ii) provide current shaping to impose the same waveshape or frequency as the grid voltage on to the grid current, and complementarily, control the one or more traction converter switches to (i) provide inversion synchronous with the grid voltage, or (ii) provide current shaping to impose the same waveshape or frequency as the grid voltage on to the grid current. Accordingly, the controller manipulates the operation of the switches such that either the switching stage provides the inversion, and the traction converter switches provides the current shaping, or vice versa. The current shaping, along with the inversion effectively forces the grid current to have the same or similar shape or frequency as the grid voltage.

Some embodiments described are directed to technology, the commercialization of which would help to resolve or mitigate environmental impacts or conserve the natural environment and resources. The technologies pertain to green technologies including greenhouse gas reduction by way of advancing energy conservation by usage of less-polluting and less impactful energy sources, including an increased adoption and efficiency having regard to renewable energy resources. Some embodiments described reduce overall physical component requirements (e.g., by way of reusing existing magnetics through improved control techniques and circuit topologies). Furthermore, flexible power factor and reactive power considerations aid in establishing connections to electrical grids, for example, to provide power back into the electrical grid, as required in certain situations. Improved control characteristics allow for a more flexible range of operation.

The fast charger is provided in the form of an improved converter topology (which, in some embodiments, is provided in the form of an electric circuit, hardware device, or circuit board storing electronic components thereof), whereby a converter is provided that is adapted for bi-directional power flow and/or flexible operation at different power factors. Methods of operating same and providing same are contemplated in some embodiments, and furthermore, in some embodiments, machine readable media (e.g., computer readable media) storing machine readable instruction sets are contemplated. These instruction sets, when executed on hardware circuits, including waveform controllers, implement parts of the methods described herein.

In some embodiments, bi-directional power flow is provided independently from flexible operation at different power factors, and in other embodiments, flexible operation at different power factors is provided without bi-directional power flow. In some embodiments, a combination of bi-directional power flow is provided and flexible operation at different power factors is provided.

The bi-directional charger is capable of both charging and discharging an energy storage device (e.g., battery, capacitor), and thus may supply real and/or reactive power to another element (e.g., a power grid) such that the vehicle's battery can be used as a back-up power supply among other uses. Bi-directionality, for example, is useful in emergency situations, such as where power is scarce and the battery of a vehicle is a last resort to drive another device, such as a generator (e.g., to maintain operations for a hospital during a hurricane).

In some embodiments, a single traction converter version is described. In other embodiments, two traction converters are provided that interoperate with one another. Two traction converters, provides among other benefits, an increased voltage range.

The fast charger can be modelled as having an "switching stage" and "traction converter" components, and in combination, the "switching stage" and "traction converter" components with an energy storage device can be considered a "charging stage" where a "on-board fast charger" is composed of one or more "charging stages" and a motor.

The switching stage is a set of switches that can be utilized for either (1) providing inversion or (2) current shaping, or a combination thereof, according to various embodiments, whereby the switches of the traction converters are utilized for the other functionality. Current shaping is utilized to reduce harmonics such that the waveforms track (e.g., attempt to match) the waveform of the input source (e.g., an AC source having a specific waveform and frequency).

An important consideration to note is that the switches of the switching stage can be selected to optimize a switching efficiency, while the switches of the traction stage have less flexibility for selection as the switches of the traction stage are often either already present on electric vehicles, or have already been selected to be optimized for a different function, such as providing locomotion (for electric vehicle) or torque generally (for a generator). Accordingly, the switches of the traction stage are likely to be better for either providing inversion functionality or current shaping functionality depending on the specific switches utilized in the traction stage, relative to the switches of the switching stage.

In this specification, the switching stage may be referred to as an inverting stage, but in various embodiments, the functionality of the inverting stage and the traction stage may be reversed such that the inverting stage provides current shaping and the traction converters provide current inversion. In further embodiments, the selection of which of the switching stage and the traction stage provide which functionality is determined, either pre-determined or dynamically determined, by a controller circuit. The controller circuit, in some embodiments, monitors operating characteristics of the device (e.g., through sensors) or switch operating parameters to select and assign functionality to the switching stage and the traction stage. The functionality is implemented through modifying the control mechanism applied to the switches such that the switches of the specific stage are controlled to operate in accordance with gating signals that determine which switches conduct and at what times (e.g., at what frequency).

Monitored operating characteristics include determinations of switching losses, and operating parameters may include switch ratings, switch mechanisms of operation (such as transistor type), among others. In some embodiments, the fast charger includes sensors which are utilized to monitor the grid voltage and its characteristics, for example, to track how well the grid current waveform matches that observed at the grid voltage (e.g., to provide control through feedback).

The inverting stage may be implemented with current bi-directional two quadrant switches as opposed to single quadrant switching devices, and when these switches are used, the inverting stage may invert the voltage of the ac fast charger at any phase of the fundamental grid frequency provided that the maximum expected input voltage at the differential terminals of the converter is less than the sum of the two energy storage element voltages. Other embodiments are possible, for example, diodes can be utilized rather than the current bi-directional two quadrant switches, but where diodes are utilized, the charger is not able to provide bi-directional charging and operates at unity power factor.

Switching device examples with current bi-directional two quadrant switching capability include insulated gate bipolar transistors (IGBT), power metal oxide semiconductor field effect transistors (MOSFETs), among others. Switching device examples with current uni-directional switching capability include diodes, among others. In the case of single inverter embodiments, the battery voltage must be greater than the peak voltage under all conditions. In the case of dual inverter embodiments, the sum of the battery voltages must be greater than the peak voltage under all state-of-charge conditions.

Bi-directional power flow allows for a greater range of uses relative to a typical converter, for example, where the motor of a vehicle with the charging stages (e.g., where the source of energy for the grid is from the batteries of the vehicle), can be used (e.g., instead of for transportation) as a source of energy for grid support applications, such as voltage support, frequency regulation, and peak shaving. The structure of the charger is also inherently fault-tolerant to grid-side faults, thereby potentially preventing damage to the on-board components.

Similarly, operation at different power factors allows for improved flexibility for potential grid connections for the EV fast charger (e.g., a unity power factor, a power factor of 0.7). Compared to an alternate approach where operation is required at a unity power factor, the charger of some embodiments is configured to operate in respect of real and reactive power. The ability to operate to produce or absorb reactive power provides power flexibility. The inverting stage is adapted to provide the charger with the flexibility to operate at different power factors. Flexibility of operation is useful, for example, as each power utility may operate with different characteristics, allowing the charger to flexibly modify a power factor to suit a particular power utility. The ability to operate in relation to reactive power aids in providing grid support capabilities. Injections of reactive power can help ensure that a voltage profile of the grid does meet regulatory or safety requirements, among other benefits. Reactive power is becoming increasingly desirable, and some utilities are able to demand reactive power to be fed into the grid, for example, to increase voltages depending on power demand, etc. The reactive power can be utilized to stabilize voltages at the grid.

The configuration of the fast charger provides improved control characteristics relative to alternate approaches whereby a power factor correction mechanism includes a front end rectifier, requiring control bandwidth up to the $6^{th}$ harmonic of the fundamental component (e.g., control bandwidth up to 720 Hz for a 60 Hz system). In comparison, some embodiments of the fast charger described herein only need to track a single frequency (e.g., 60 Hz frequency for a 60 Hz system, or 50 Hz, depending on a grid frequency).

In some aspects, the converter is capable of operating both as a drive and as an AC fast charger. The embodiments of the on-board fast charger can include, among others, four major parts, including a motor, traction converter, energy storage device (e.g., battery, capacitor), and inverting stage. The proposed converter is an on-board AC fast charger that advantageously utilizes the leakage inductance of the motor of an electric vehicle, enabling the charger to re-use magnetics of the motor for charging which conventionally would not be used when the vehicle is stationary, in combination with a switching stage (noted as the inverter stage in some aspects below).

The proposed on-board AC fast charger, according to some embodiments, is configured to serve dual purposes as both (i) a single-phase AC fast charger when the vehicle is stationary, and (ii) a traction converter when the vehicle is in motion. As a fast charger, the topology is capable of accommodating various commercial input AC voltages. The on-board AC fast charger redeploys the traction converter and motor for use in AC fast charging of the battery when stationary. An isolation transformer may not be necessary in some situations, and if required, the transformer itself could be installed at the charging station. Accordingly, minimal charging infrastructure is needed for the charging station, limited to either a cable or cable with isolation transformer.

The proposed AC fast charger of some embodiments enables AC electric vehicle charging without using a dedicated battery charger, leading to potential cost, weight, efficiency savings, and improved convenience for the customer (e.g., a driver of the electric vehicle). For some embodiments that use a single traction converter, the EV dynamically redeploys the traction converter and motor for use in AC fast charging of the battery when stationary. As described above, the motor's leakage inductance is used in some embodiments to re-use components when the electric vehicle is stationary. When charging, the inverting stage and traction converter are controlled to charge the battery. Beyond charging of the battery, the system allows for bi-directional operation and can operate at various power factors, in some embodiments.

In another aspect, the converter system uses two inverter systems. Where there are two inverter systems, a dual inverter drive can be provided with two traction converters to drive the vehicle when in motion. The topology's structure allows two lower voltage batteries to be indirectly series connected through two traction converters. This implies that the voltage range is expanded, thus allowing for higher input AC voltages to be accommodated during charging without the need for a boost-type converter, for instance.

As a motor drive, the dual inverter drive has the benefit of increasing the rated voltage of the motor drive, and consequently increasing drive system efficiency. Such an embodiment also has two separate energy storage units where one or two of these energy storage units may be batteries of similar or dissimilar chemistry. In various further aspects, the disclosure provides corresponding systems and devices, and logic structures such as machine-executable coded instruction sets for implementing such systems, devices, and methods.

In an aspect, an electric vehicle fast charger adapted for re-using magnetic components of a motor of an electric vehicle and the traction converter that are not in use when the electric vehicle is stationary is provided, the electric vehicle fast charger configured for coupling to the motor and removable coupling to a power grid: the electric vehicle fast charger comprising an inverting stage including either current uni-directional switches configured to invert the voltage to maintain unity power factor operation or current bi-directional two quadrant switches configured to invert the voltage of the traction converter at any phase of the fundamental grid frequency provided that the maximum expected input voltage at the differential terminals of the fast charger is the peak voltage of the AC source.

In another aspect, the electric vehicle fast charger is positioned within a housing of an electric vehicle and coupled to both (i) one or more electric motors of the electric vehicle and (ii) one or more energy storage devices of the electric vehicle.

In another aspect, one or more magnetic components of the one or more electric motors is utilized for providing propulsion during drive mode of the electric vehicle, and to control power flow to or from the one or more energy storage devices of the electric vehicle to the power grid during charging mode.

In another aspect, the electric vehicle fast charger is configured for operation at a plurality of power factors.

In another aspect, the electric vehicle fast charger is configured for bi-directional power flow operation.

In another aspect, the electric vehicle fast charger is configured for providing power flow to the power grid.

In another aspect, the electric vehicle fast charger is configured to control the flow of reactive power to the power grid.

In another aspect, two or more traction converters are configured for interoperation with one another.

In another aspect, the electric vehicle fast charger variant consisting of the inverting stage of any of the above aspects is connected to an energy storage device, a traction inverter, and motor where the power grid is connected to the inverting stage and motor where the inverting stages are configured such that the maximum expected AC source input voltage at the differential terminals of the fast charger is below the voltage of the energy storage device.

In another aspect, a variant charger is provided consisting of two inverting stages, two energy storage devices, two traction inverters, and a motor where the power grid is connected to the two inverting stages where the inverting stages are connected in such a way that the maximum expected AC source input voltage at the differential terminals of the fast charger is below the sum total voltage of the two energy storage devices.

In another aspect, the charger is controlled by control hardware that need only track a signal at the grid frequency.

In another aspect, an electric vehicle is provided including the electric vehicle fast charger of any of the embodiments.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of this disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 3A includes a single return connection from the motor (i.e., an accessible neutral point), and FIG. 3B includes a three-phase return connection from the motor (open-stator).

DETAILED DESCRIPTION

Figure 1A:
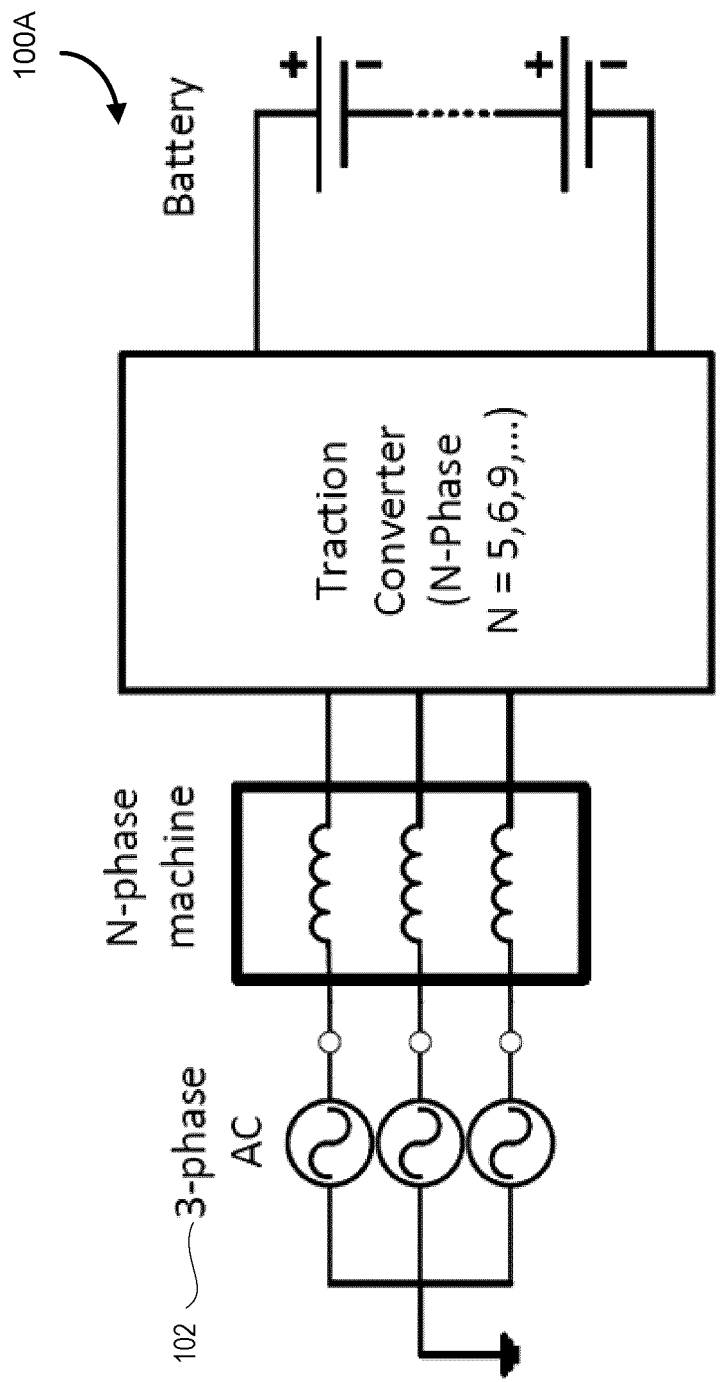
FIGS. 1A-1D are schematic diagrams of alternative on-board charger approaches.

A typical on-board charger consists of a DC/AC stage and an isolated DC/DC stage connected to the AC grid. Alternatively, isolation can be provided through an off-board transformer. The isolated DC/DC stage is able to accommodate variations in battery voltage. Such an on-board charger is an additional component to a vehicle, which adds cost and weight to the vehicle that is un-used when the vehicle is in motion.

As described in some embodiments herein, an improved approach for utilizing existing magnetics (e.g., of the vehicle when it is not in motion) for providing fast-charging capabilities. The proposed converter of some embodiments is an on-board AC fast charger that advantageously utilizes the leakage inductance of the motor of an electric vehicle, enabling the charger to re-use magnetics of the motor for charging which conventionally would not be used when the vehicle is stationary. An additional switching stage (having one or more sets of switches) is provided. The sets of switches of the additional switching stage are complementarily controlled along with the switches of the traction components such that waveform control of the current flowing between the grid and the fast charger can be performed. Either the switching stage or the traction components perform inversion, and the other performs current shaping through coordinated control of their component switches by a switching controller.

The switching controller attempts to impose controls to the current to track (e.g., match) the voltage waveform coming from the grid, which improves interoperability, as noted herein. The solutions described in various embodiments help reduce switching losses and improve controllability relative to some alternate approaches. Some embodiments can provide improved interoperation with DC grid sources, and other embodiments can provide improved interoperation with AC grid sources. In some embodiments, the circuit can be used interchangeably with AC and DC grid sources. AC and DC sources are described below, and are meant to be non-limiting examples.

A technical distinction, in some embodiments, is that a sinusoidal grid voltage can be achieved while simultaneously maintaining a sinusoidal current within the motor windings. Relative to a diode converter, which requires a rectified sinusoidal motor current to flow, the ability of the topology of some embodiments, to operate with sinusoidal motor currents eliminates significant harmonic losses (e.g., non-50/60 Hz components, which could depend on jurisdiction, etc.) in the motor and reduces the distortion in an AC grid current.

The need to have only 50/60 Hz currents to flow in the motor significantly reduces the required bandwidth of any associated control system and can also enable use of lower switching frequencies, thus further reducing losses.

A summary of AC level charging is shown in Table I.

For AC level 1 charging, the rectifier and DC/DC converter is typically installed on-board the vehicle to provide simple "plug-in and charge" functionality. The charger at this power level delivers up to 1.4 kW to the battery, and can be plugged into any available 120V single-phase residential power outlet.

AC level 2 chargers offer EV charging between 4 kW to 19.2 kW from 240V single-phase or three-phase private or public outlets.

AC level 3 charging is available at commercial fast charging stations, but requires dedicated off-board hardware to supply power level above 50 kW.

To address charger complexity, combined traction and charging systems have been studied extensively by the Applicant. An objective is to configure on-board traction components for charging, thus eliminating or greatly reducing the complexity of battery chargers. Alternate approaches proposed an integrated charger based on a 9-phase traction system. The on-board traction components, in accordance with some embodiments, accommodates fast charging by providing a topology that can accommodate a plurality of commercial input AC voltages.

As shown in the circuit diagram 100A on FIG. 1A, the machine's neutral points can be directly connected to a three-phase AC input 102, thus requiring no additional hardware between the AC grid and traction system. This topology also produces no net torque for vehicle propulsion in the charging process.

Figure 1B:
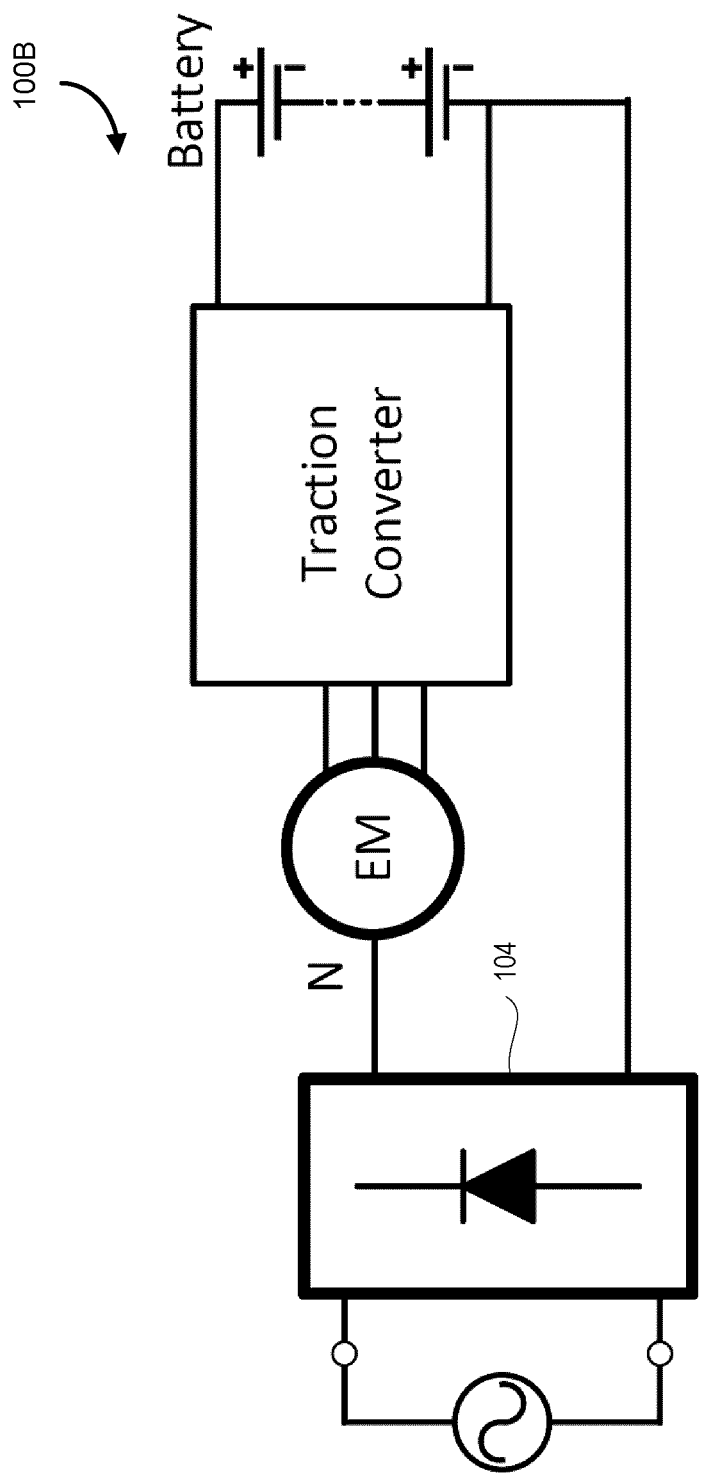
Figure 1C:
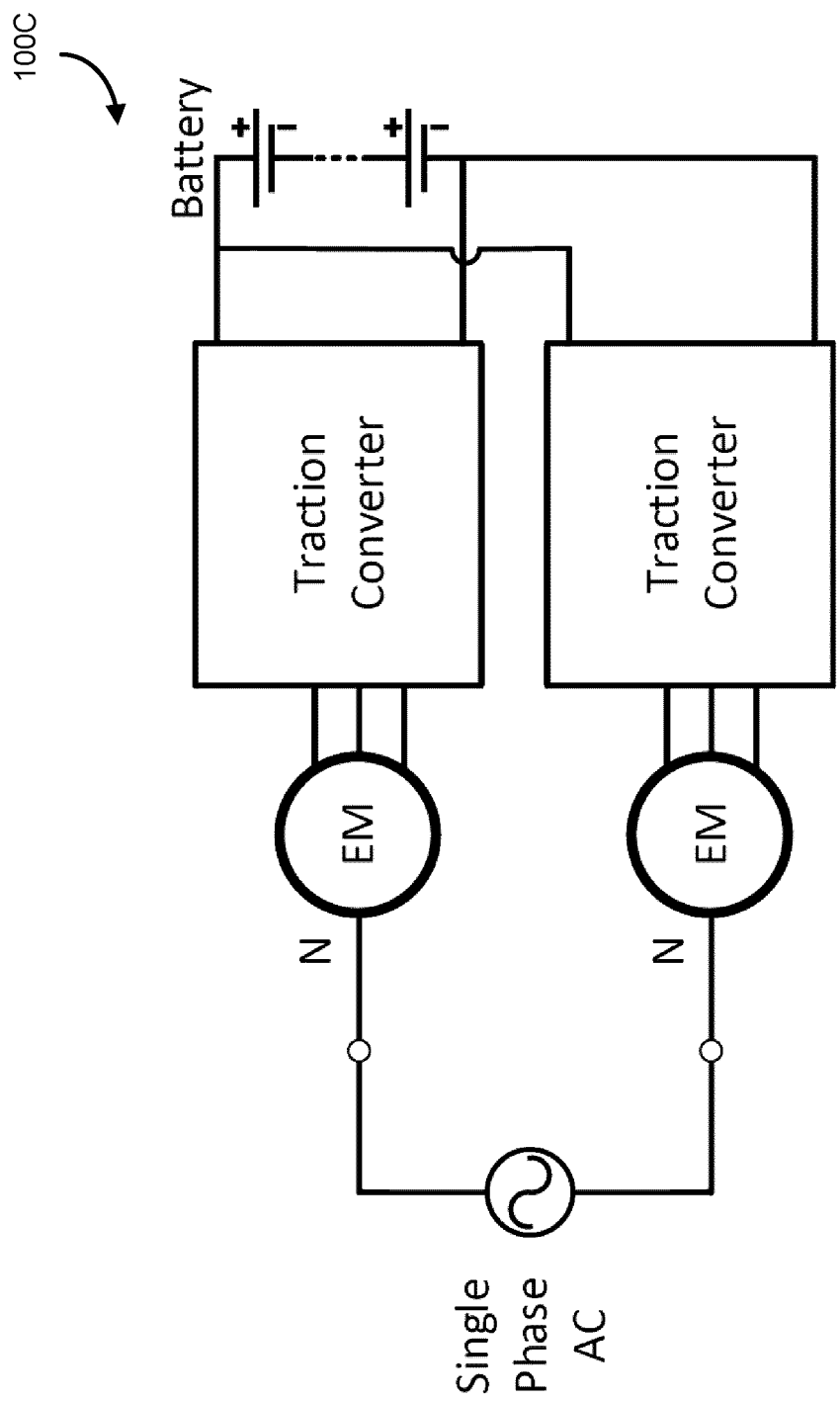

Other multiphase machines for integrated charging have been considered. In terms of integrated charging via single-phase AC systems, FIG. 1B shows the topology proposed by a second approach. It employs the traction system as a PFC boost converter, which is interfaced to a single-phase AC source via a rectifier 104. In FIG. 1C, yet another alternate approach used a set of parallel-connected traction converters and two motors to charge from a single-phase AC source and thereby eliminates the need for the rectifier.

In either topology, the charger requires no additional DC/DC converters, thus addressing weight, volume, and cost considerations of the electric vehicle supply equipment (EVSE). However, in both cases, the minimum allowable battery voltage must always exceed the peak voltage of the AC mains. For example, in the dual inverter embodiment of FIG. 2B, double the AC voltage can be supported for a given level of battery voltage, which is an improvement relative to the topologies shown above in FIGS. 1A-1C. In some embodiments, this is an important consideration as it allows the accommodation of standard battery/energy storage devices without the need for specialized battery/energy storage devices. A standard 600 V class of semiconductors can be utilized, for example, to achieve the topology shown, as opposed to a higher voltage class of semiconductors. For example, in the topologies shown above in FIGS. 1A-1C, higher classes of semiconductors and energy storage devices would be required, increasing cost and complexity, and may reduce safety.

For drive applications, the dual inverter traction system uses two traction converters to increase speed range and battery integration without the use of DC/DC power converters or additional magnetic materials, thus offering an efficient and light-weight solution attractive for electric vehicles.

Figure 1D:
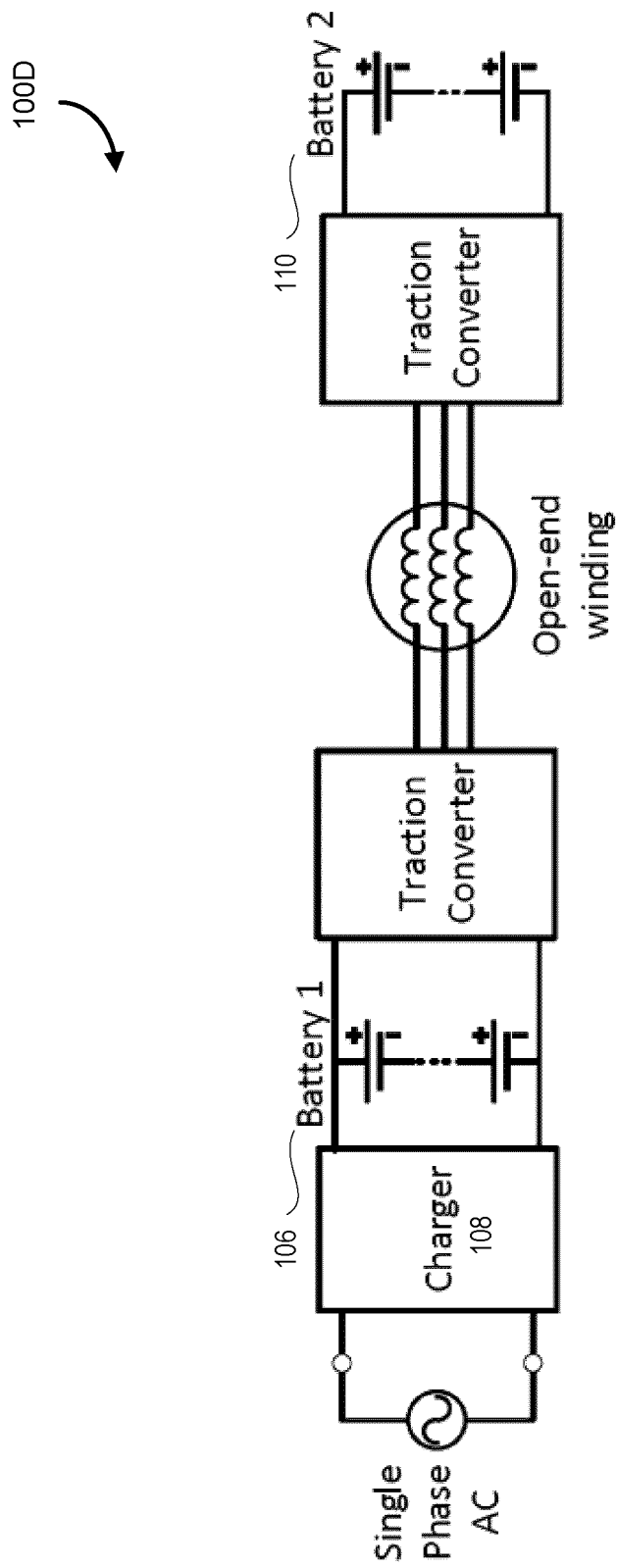

A challenge associated with the dual inverter drive is the need to charge two independent batteries. An alternate approach demonstrated that a single charger could be utilized for charging both batteries. Shown in FIG. 1D, the primary battery 106 is charged using a standalone charger 108, while the secondary battery is charged from the first via the traction system 110.

TABLE I

| Charging Level | Charger Location | Typical Use | Expected Power Level |
| --- | --- | --- | --- |
| AC level 1 | On-board | Home or office | 1.4 kW (12 A) |
| 120 Vac (US) | 1-phase | | 1.9 kW (20 A) |
| 230 Vac (EU) | | | |
| AC level 2 | On-board | Private or public outlet | 4 kW (17 A) |
| 240 Vac (US) | 1-phase or 3-phase | | 8 kW (32 A) |
| 400 Vac (EU) | | | 19.2 kW (80 A) |
| AC level 3 or DC | Off-board | Commercial charging | 50 kW |
| 208-600 Vac or Vdc | 3-phase or DC mains | station | 100 kW |

Figure 2A:
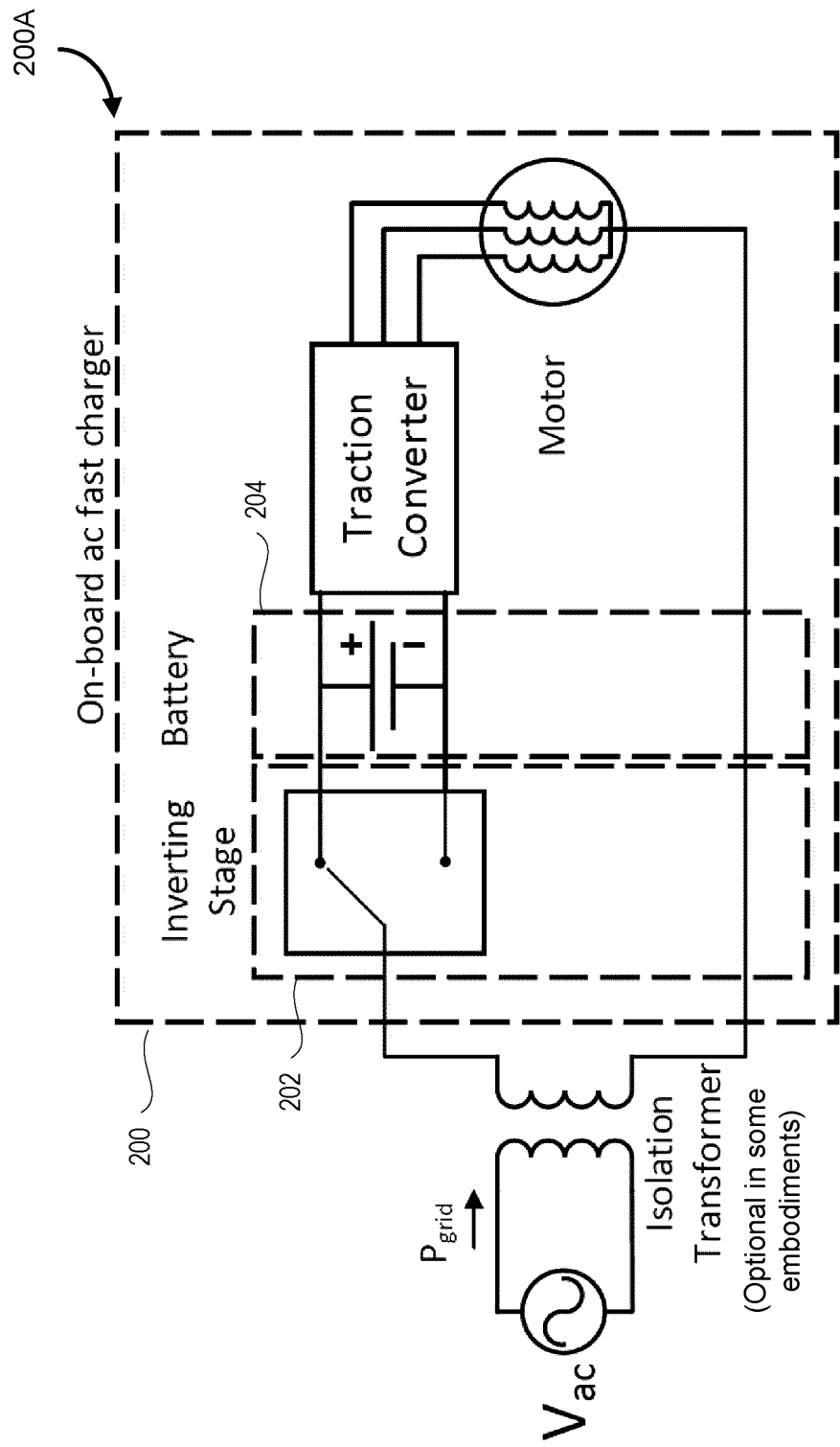
FIG. 2A is a topology diagram illustrating a proposed integrated battery charger using a motor with an accessible neutral point, according to some embodiments.
Figure 2B:
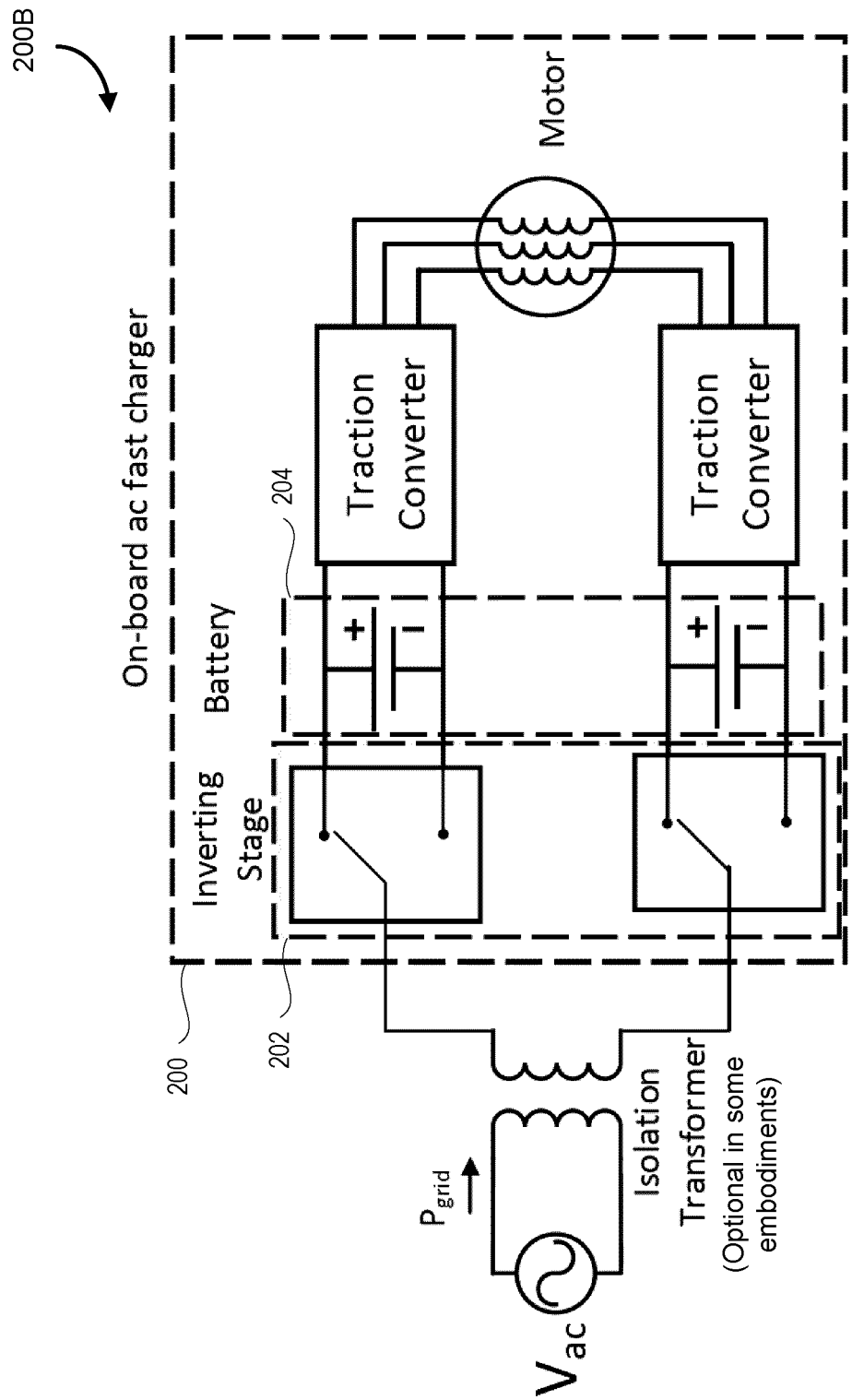
FIG. 2B is a topology diagram of an alternate embodiment utilizing two traction converters, according to some embodiments.

FIG. 2A and FIG. 2B are schematic diagrams 200A and 200B illustrating two embodiments of the on-board EV fast charger. FIG. 2A is directed to an onboard AC fast charger 200 with a single inverter circuit 202 connected to energy storage (battery) 204. FIG. 2B is directed to an inverting stage having dual inverter circuits 202, each inverter circuit connected to a corresponding battery of 204 and traction converter.

As shown in FIG. 2B, the inverting stage can be utilized to perform high frequency switching and shaping of the current provided from the source (e.g., a grid). Relative to a rectifier approach (e.g., of FIG. 1B), an improvement is provided as a rectifier is unable to shape a current, forcing the traction inverters to shape the current. This may be potentially important due to the higher rating of the traction converter switches, employing the traction inverters for current shaping leads to higher switching losses and lower system efficiency. If a high frequency inverting stage is utilized, it also enables the approach to operate with bi-directional power exchange to the grid, which would not be possible with a diode rectifier approach.

In contrast to the single inverting stage of FIG. 2A, the dual inverting stage of FIG. 2B allows lower voltage-rating components (e.g., more cost efficient semiconductors) in the inverting stage, allowing interleaved switching techniques to be leveraged to improve an effective switching frequency (which may reduce switching losses). Relative to the diode approach, connections to higher voltage AC networks can be achieved without significantly increasing battery voltage levels. For example, in the approach of some embodiments, where it is important to keep battery voltage levels low in a vehicle for safety reasons, e.g., 450 V, the approach can utilize two 450 V batteries operating with inverting stages, in contrast to the diode rectifier approach of FIG. 1B, which would require a 900 V battery (which increases a hazard level arising from a potential short circuit current within the system).

An on-board EV fast charger is introduced, offering cost-effective and convenient EV charging from an AC power outlet. The converter is capable of operating both as a drive (providing locomotion through torque, for example, as the electric vehicle is being driven from location to location) and as a DC or AC fast charger.

The embodiments of the on-board fast charger are comprised of four major parts, which are the motor, traction converter, battery, and switching stage (interchangeably noted as "inverting stage", but note that it is not necessarily limited to inversion and can also be used for shaping). In both embodiments shown in FIGS. 2A and 2B, the AC power outlet is directly connected to the proposed on-board integrated charge and drive system.

The isolation transformer may not be necessary depending on the requirements of a particular usage scenario. If required, the transformer itself could be installed at the charging station. This implies that minimal charging infrastructure is needed for the charging station. It would be limited to either a cable or cable with isolation transformer.

The proposed on-board AC fast charger of some embodiments serves a dual purpose as both a single-phase AC fast charger when the vehicle is stationary, and a traction converter when the vehicle is in motion. As a fast charger, the topology is capable of accommodating all common commercial input AC voltages including 208V commercial, 277V/480V commercial (US), 240/400V (EU) and 347V/600V commercial (Canada) when charging. This enables AC electric vehicle charging without using a dedicated battery charger, leading to considerable potential in cost, weight, efficiency savings, and convenience for the customer.

For some embodiments that use a single traction converter as shown in FIG. 2A, the EV dynamically redeploys the traction converter and motor for use in AC fast charging of the battery when stationary.

Use of the motor's leakage inductance allows the charger to re-use components that are not in use when the vehicle is stationary. When charging, the inverting stage and traction converter are controlled to charge the battery. Beyond charging of the battery, the system allows for bi-directional operation and can operate at a plurality of power factors.

Another embodiment of the converter system uses two inverter systems 202 as shown in FIG. 2B. This embodiment use a dual inverter drive with two traction converters to drive the car when in motion. The topology's structure allows two lower voltage batteries 204 to be indirectly series connected through two traction converters. The structure provides that the voltage range is expanded, thus allowing for higher input AC voltages to be accommodated during charging without the need for a boost-type converter, for instance.

As a motor drive, the dual inverter drive has the potential benefit of increasing the rated voltage of the motor drive, and consequently increasing drive system efficiency. Such an embodiment also has two separate energy storage units where one or two of these energy storage units may be batteries of similar or dissimilar chemistry (or other energy storage devices).

While the two energy storage sources in the figure are batteries, any energy storage source may be used (i.e., batteries, supercapacitors, fuel cells, or any combination thereof). For illustrative purposes, energy storage sources of battery type are referred to in this document.

Two inverting stages would be used in conjunction with the two traction converters to charge the energy storage units, in an embodiment. In comparison to embodiments that use a single inverter, the dual-inverter embodiment would require an open-ended machine as shown in FIG. 2B, although some embodiments may use a multi-phase machine. Both the single-inverter and dual-inverter embodiments use the same principles to achieve single-phase fast charging from the AC grid (or a DC grid in some embodiments).

The operation of some embodiments of the charger shown, for example, in FIGS. 2A and 2B is described below. The converter topology is operating as an on-board charger. As a drive, the topology would normally operate as an inverter drive when the EV is in motion.

Figure 3A:
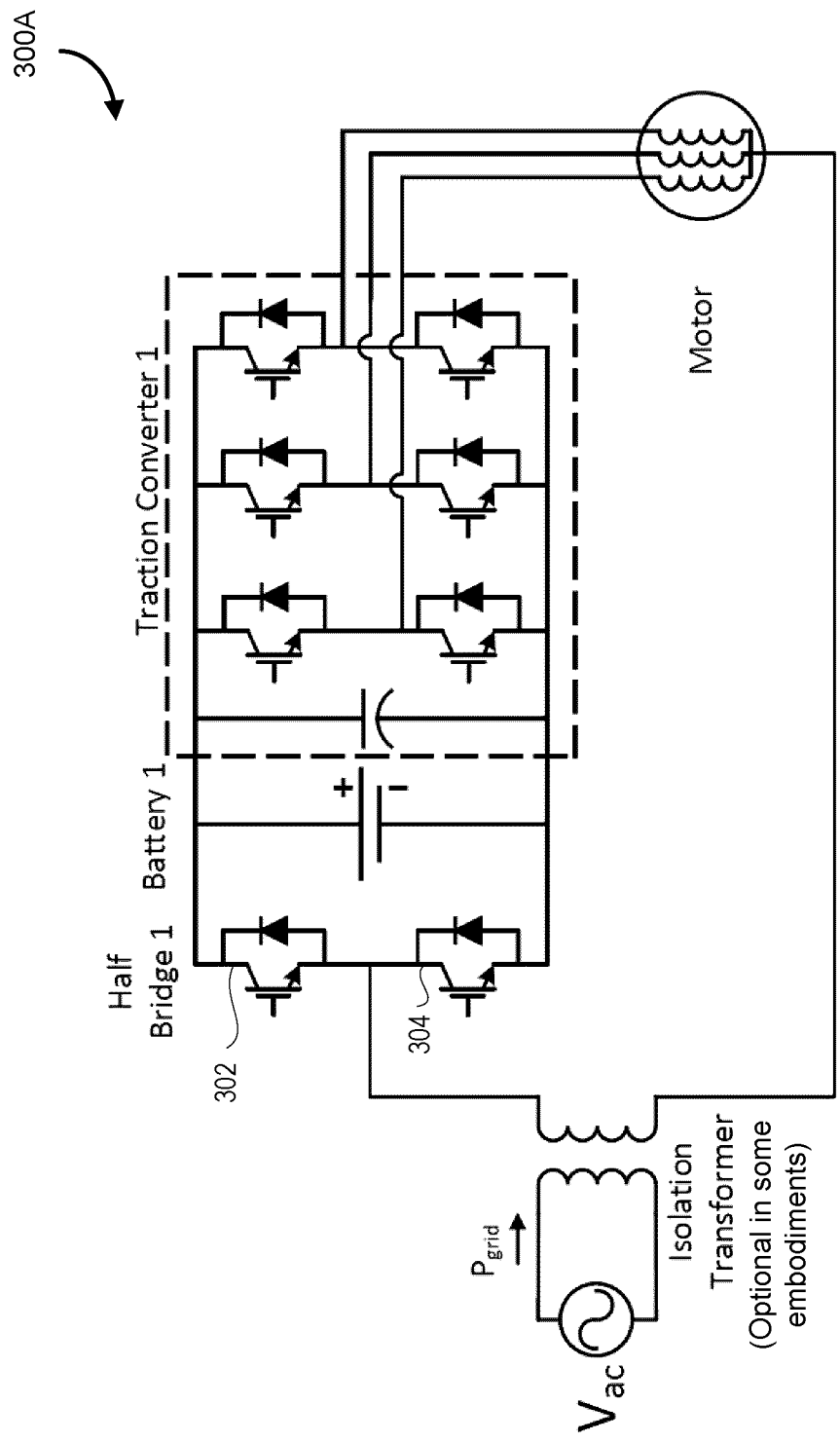
FIGS. 3A and 3B are topology diagrams of some embodiments of a proposed integrated battery charger using a single inverter (FIG. 3A) and a dual inverter system (FIG. 3B), according to some embodiments.
Figure 3B:
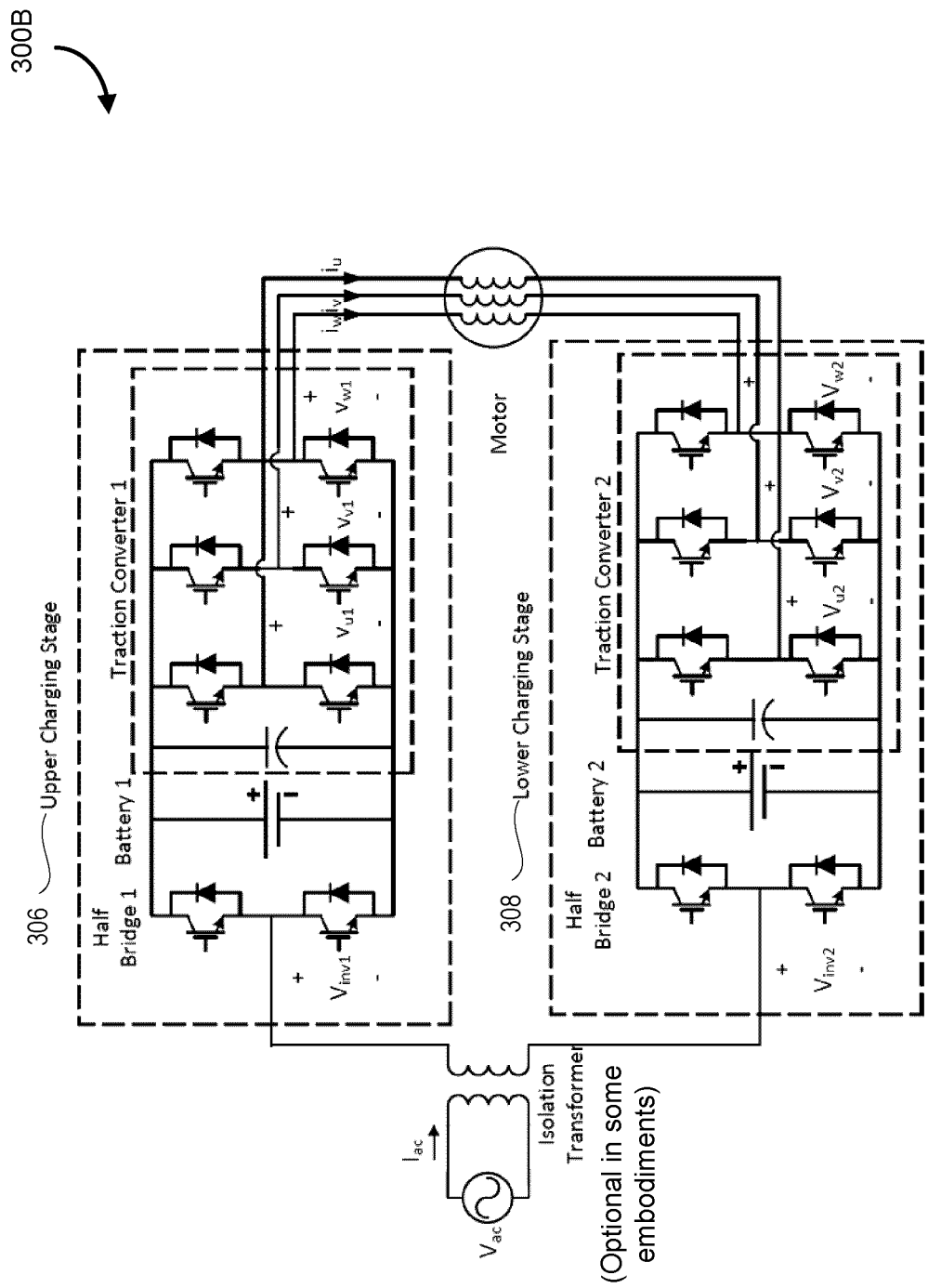

Two exemplary embodiments of the proposed AC fast charger are shown in FIGS. 3A and 3B, which are schematic diagrams illustrating a single inverter embodiment in FIG. 3A and a dual inverter embodiment in FIG. 3B. In these example embodiments, the inverting stage (e.g., inverter circuit) is implemented with IGBT active switches 302 304, but alternative switching devices may be used.

With reference to FIG. 3B, shaping of the current can be achieved either through modulation of the inverting stage (in this figure, half bridge 1 or 2), or through the traction converter (e.g., traction converter 1 or 2), or a combination thereof. Shaping of the current is conducted through controlling operation of the switches of the inverting stage and/or the traction converter, such that the current is shaped to track a desired signal shape (e.g., a sinusoid in the context of an AC source, or a DC signal in the context of a DC source).

It is important to note that the inverting stage is not necessarily limited to inverting, rather, it, in some embodiments, can also be considered a shaping stage (e.g., the switches are used for current shaping). In such cases, the traction inverter takes the role of the inverting stage. Where the inverting stage is used for shaping, the embodiments described in various embodiments herein (and combinations and permutations thereof) would thus substitute the term inverting stage for shaping stage.

The inverting stage and the traction stages are utilized for (1) inverting and (2) shaping. In an embodiment, one of the stages is utilized for inverting and the other for shaping, and a controller can be utilized to effectively assign which of the stages is utilized for inverting and which is utilized for shaping (e.g., by changing a switching pattern, where one is switching at 50/60 Hz (the one conducting inverting), and the other is switching at higher frequency (the one conducting shaping)). The stage with the higher switching loss would, in an embodiment, be operated at the lower frequency, and this may be selected by a controller circuit of some embodiments.

In a specific embodiment, the traction converter is utilized for inverting and the inverting stage is utilized for shaping, as typically, the traction converter has higher switching losses due to its dual use for providing drive functionality (e.g., to a motor vehicle). In an alternate embodiment, the inverting stage is utilized for providing inverting functionality (e.g., inverting the grid voltage in accordance with a switching control) and the traction converter is utilized for shaping functionality (e.g., this would occur if loss analysis indicates that such an approach would be more efficient, which, for example, could be selected, either pre-determined or dynamically determined by a controller circuit). In a case where an inverting stage is comprised of diodes, the shaping must be done by the traction converter.

Generally, the traction converter is larger than the inverting stage, meaning that switching in the traction converter stage has higher losses. In such a case, the switching would preferentially be conducted at the inverting stage, providing a mechanism to optimize losses (e.g., first optimizing efficiency of the drive and traction converters and thereafter designing and optimizing the inverting stage for improved charging efficiency (e.g., maximum charging efficiency). A drawback of the alternative diode approach is that a smaller charger integrated with a large drive may be highly inefficient as shaping of a small charging current would have to be performed by a traction converter using large semiconductors with relatively high switching losses (which, for example, can be fixed regardless of how much current is being drawn, so this problem is exacerbated for smaller charging currents).

An embodiment of the proposed system could use diodes instead of IGBTs, but with reduced functionality. For the remainder of this document, discussion will focus upon dual-inverter embodiments of the AC fast charger as single-inverter embodiments operate identically with appropriate minor adjustments.

Figure 4:
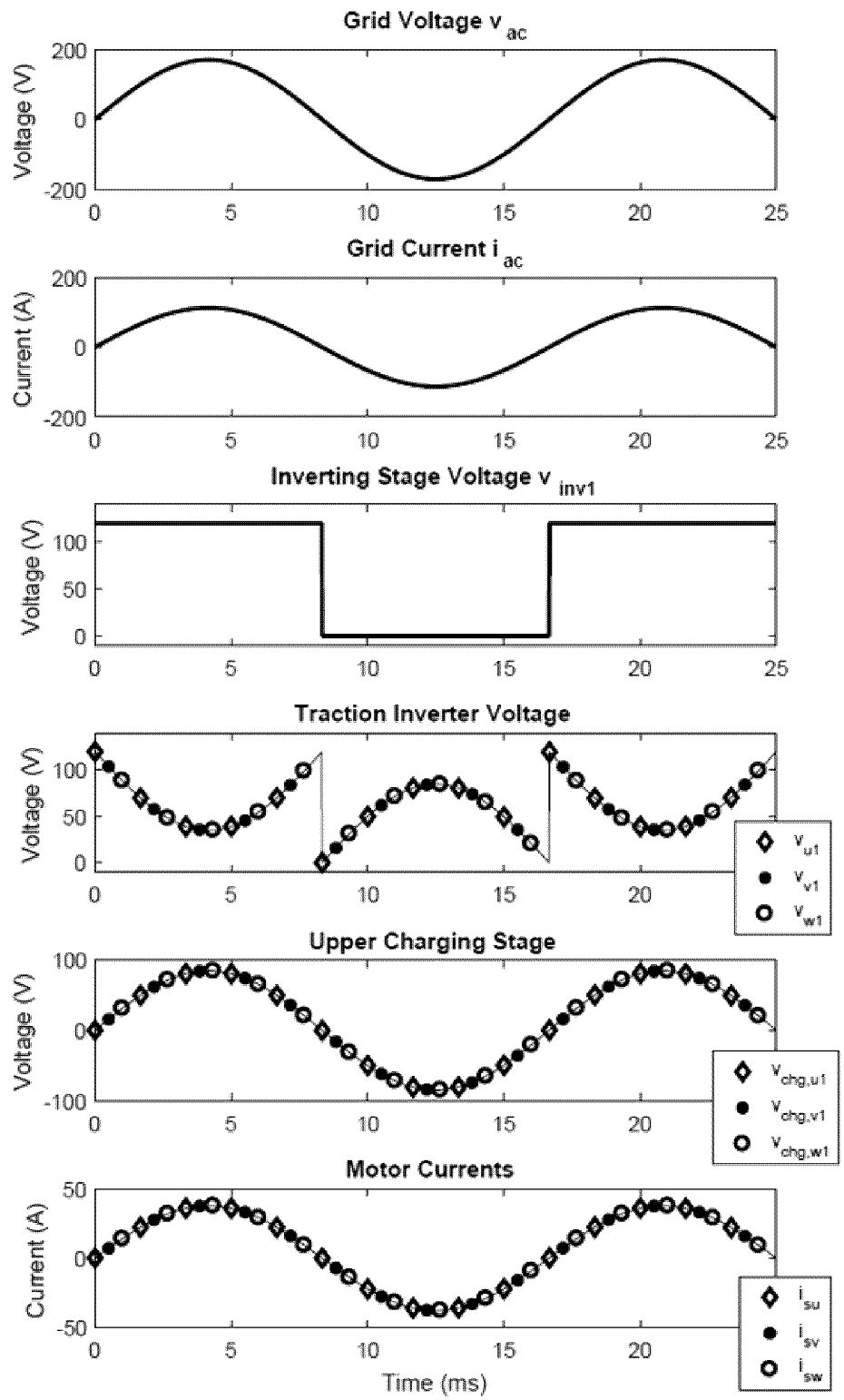
FIG. 4 is a set of waveform diagrams illustrating, for example, system (dual inverter version) waveforms when operating at unity power factor, according to some embodiments.

Exemplary waveforms are provided in FIG. 4 based on FIG. 3B. The dual-inverter embodiment shown in FIG. 3B is divided into the upper charging stage 306 and lower charging stage 308 where each charging stage consists of a traction converter, battery, and inverting stage. In this example, the traction converter is providing the shaping functionality.

Effectively, the inverting stage voltage, $v_{inv1}$, is providing the on-off state of the inverting stage, and the traction inverter voltage is proportional to the modulation index of the inverting stage.

When operating as part of the on-board fast charger, each traction converter phase denoted as u, v, and w will produce equal voltages in order to drive the same current through each phase of the motor. Hence, FIG. 4 shows $i_{su}$, $i_{sv}$ and $i_{sw}$ is one third of $i_{ac}$. These equal currents are referred to as zero sequence currents and the machine will not produce any average torque when only zero sequence currents are passed through the motor. Thus, this arrangement is suitable for stationary charging of the batteries. In certain embodiments, a zero sequence current can be a 50/60 Hz sinusoidal state/waveform, when charging from AC, or it would be a DC current when charging from a DC source. In either case, the rotor of the machine is exposed to no rotating flux, such that no rotational torque would be produced.

In addition to tracking identical currents, complementary modulation may also be applied across the top and bottom charging stages (e.g., inverting stages or traction converters, whichever is conducting the shaping) to reduce switching harmonics on the machine, in some embodiments. For example, in reference to FIG. 3B, if half bridge 1 and half bridge 2 are performing the shaping, switches of half bridge 1 would be operated complementarily to half bridge 2 switches, or vice versa. For example, the devices are switching at high frequency and can be operated at different modulation carrier phase shifts to reduce harmonics (e.g., phase shift can be adjusted to reduce the effect of harmonics, for example, by 180 degrees).

In embodiments where the traction converters are conducting the shaping, each phase of the modulation carrier in each converter leg is offset (e.g., 120 degrees for a 3 phase traction converter) from the neighboring leg to further minimize harmonics in the input charging current (e.g., AC or DC, in accordance with various embodiments).

The waveforms in FIG. 4 show the voltages produced by the upper charging stage when an on-board fast charger is connected to grid voltage $v_{ac}$ and current $i_{ac}$. As described, the voltage produced by the upper charging stage $v_{chg;u1}$, $v_{chg;v1}$, and $v_{chg;w1}$, defined as:

$$v_{chg,u1} = v_{inv1} - v_{u1} \tag{1}$$

$$v_{chg,v1} = v_{inv1} - v_{v1} \tag{2}$$

$$v_{chg,w1} = v_{inv1} - v_{w1} \tag{3}$$

are equal and approximately half of the AC grid voltage.

In this non-limiting example (note that the inverting function and the shaping function can be conducted by a different combination of the half bridge of FIG. 3B and the traction converter), the inverting stage (e.g., whichever stage is performing the inversion function) voltage vinyl illustrates that the inverting stage only operates every half cycle in order to allow the charging stage to produce bipolar voltages. As voltage inversion only occurs every half line cycle, the inverting stage must switch at a minimum of 60 Hz (or 50 Hz), but could be switched at a higher frequency if desired while producing similar results. This minimizes cooling as the inverting stage can be optimised for conduction losses only, which reduces cooling requirements and system weight.

The grid voltage and current show the expected input from the grid. Only the upper charging stage waveforms (denoted with subscript 1) are plotted because the lower charging stage is identical. It is expected that the upper and lower charging stage produce an equal voltage. This is why the upper charging stage voltage is equal to half the grid voltage.

The inverting stage and traction converter voltage shows the voltage produced at the terminals of each half bridge. The combination of these two voltages equals to the overall charging stage voltage. The traction converter voltage, upper charging stage voltage and motor currents show three waveforms because there are three phases to the traction converter. In this example, all three-phases are operated identically. Therefore the current in the three-phases are identical and equal to one third of the grid current.

In this diagram, the system is operated at 60 Hz (at the grid frequency, or at 50 Hz) to allow the charging stage as a whole to produce bipolar voltages. However, the operation is showed as an example and the charger is not limited to operating the inverting stage at 60 Hz (or 50 Hz). The charging stage (inverting stage and traction converter together) can be considered as a bipolar voltage source. Operating requirements are satisfied so long as the charging stage produces half the AC voltage.

Finally, the traction converter alone is only able to produce voltage of a single polarity. If the traction converter produces $v_{u1}$, $v_{v1}$, and $v_{w1}$, which are identical, as shown in FIG. 4 combined with the inverting stage output, the desired $v_{chg;u1}$, $v_{chg;v1}$, and $v_{chg;w1}$ are produced. The traction converter must operate at a frequency sufficient to track the fundamental grid frequency and meet grid requirements.

Figure 13:
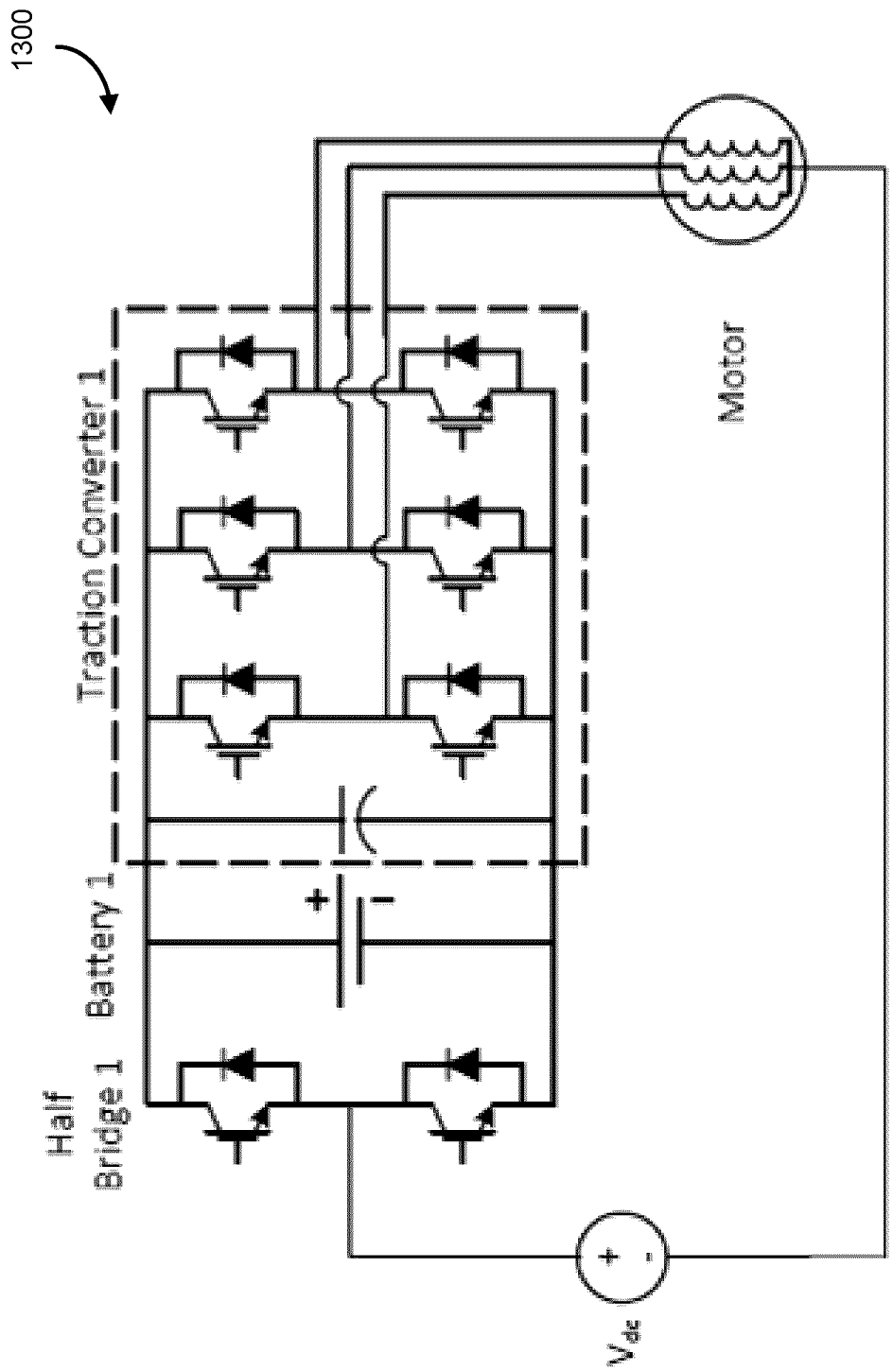
FIG. 13 is a topology diagram illustrating when the system is interfaced to a DC grid for the single-inverter drive variant, according to some embodiments.

In addition to AC operation, the proposed system is also applicable to DC systems as shown in FIG. 13, shown in diagram 1300A. This is similar to the operation of an alternative approach, however bidirectional fault blocking capabilities are now added due to the inverting stage. For example, the topology of FIG. 2B can be flexibly deployed to accommodate either DC or AC sources, in some embodiments. Where the source is DC, the circuit can still regulate current even if inversion is not required and DC currents flow through the motor windings.

Figure 5:
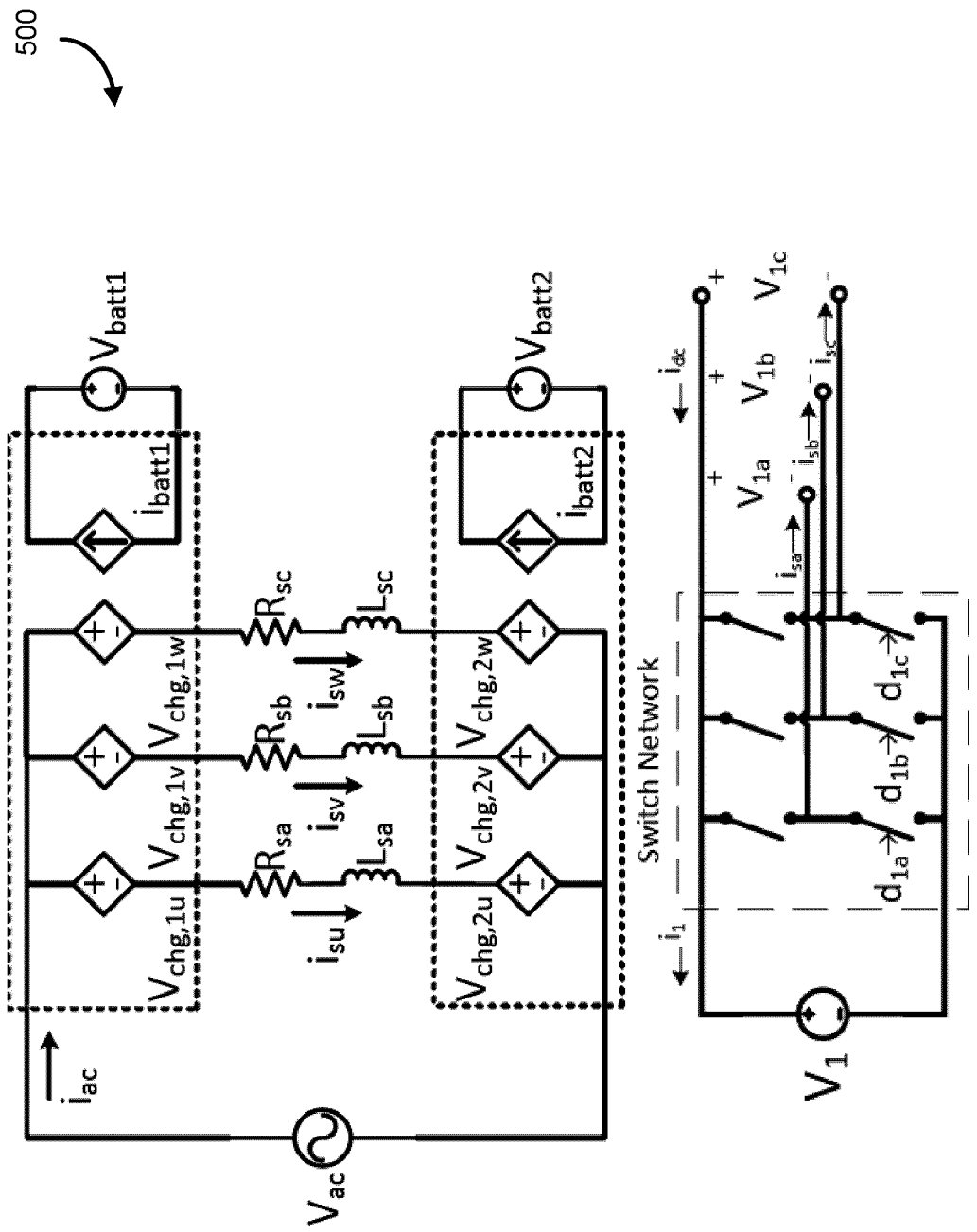
FIG. 5. is an average model of the dual inverter embodiment, illustrating that the charging stage can be viewed as three bipolar voltage sources (one for each phase of the traction converter), whereby the three bipolar voltage sources are linked by power balance to the dependent current source, according to some embodiments.

The nominal operation of the on-board fast charger may be further augmented to enable energy balancing between the upper and lower charging stages. This may be realised through several means best described using the average model 500 shown in FIG. 5. In the model, each phase of the charging stage is represented by a bipolar variable voltage source. In normal operation, as described earlier, the upper and lower charging stage output equal voltages.

If the state of charge (SOC) between the upper and lower charging stage energy storage devices (e.g., batteries) need to be equalized (e.g., arising from non-idealities or non-matched energy storage devices, for example, where a storage capacity is reached for only one of the energy storage devices but not the other), several different methods can be used to balance the energy between them. In some embodiments, an energy storage device monitoring mechanism (e.g., circuit) is interconnected with the switching controller so that the switching controller can modify operational characteristics to correct for the imbalance.

In normal operation the combined voltage of the charging stages must be $V_{chg}$, therefore the voltage and currents of the system are given by equation (5) to (7).

$$v_{1u} = v_{1v} = v_{1w} = 0.5 V_{chg} \tag{5}$$

$$v_{2u} = v_{2v} = v_{2w} = 0.5 V_{chg} \tag{6}$$

$$i_u = i_v = i_w = \frac{i_{ac}}{3} \tag{7}$$

The power of the upper and lower charging stage are equal as seen in equation (8) and (9).

$$P_1 = \text{Re}\{0.5 v_{chg} i_{chg}\} \tag{8}$$

$$P_2 = \text{Re}\{0.5 v_{chg} i_{chg}\} \tag{9}$$

Some embodiments of the proposed on-board fast charger can balance energy between the energy storage devices of upper and lower charging stages by either modifying the relative voltages or circulating current within the motor phases.

An example of modifying the relative voltages would be if voltages and currents were produced as given in equations (10) to (12).

$$v_{1u} = v_{1v} = v_{1w} = 0.6 V_{chg} \tag{10}$$

$$v_{2u} = v_{2v} = v_{2w} = 0.4 V_{chg} \tag{11}$$

$$i_u = i_v = i_w = \frac{i_{ac}}{3} \tag{12}$$

The power of the upper and lower charging stage are unequal as seen in equation (13) and (14).

$$P_1 = \text{Re}\{0.6 v_{chg} i_{chg}\} \tag{13}$$

$$P_2 = \text{Re}\{0.4 v_{chg} i_{chg}\} \tag{14}$$

Other voltage ratios between the upper and lower charging stage may be used provided they sum to 1.0.

An example of circulating current would be if voltages and currents were produced as given in equations (15) to (20).

$$v_{1u} = 0.6 V_{chg} \tag{15}$$

$$v_{1v} = v_{1w} = 0.5 V_{chg} \tag{16}$$

$$v_{2u} = 0.4 V_{chg} \tag{17}$$

$$v_{2v} = v_{2w} = 0.5 V_{chg} \tag{18}$$

$$i_u = \frac{i_{ac}}{3} + i_{circ} \tag{19}$$

$$i_v = i_w = \frac{i_{ac}}{3} - \frac{i_{circ}}{2} \tag{20}$$

The power of the upper and lower charging stage are unequal as seen in equation (21) and (22).

$$P_1 = \text{Re}\left\{\frac{8}{15} v_{chg} i_{chg} + \frac{1}{10} v_{chg} i_{circ}\right\} \tag{13}$$

$$P_2 = \text{Re}\left\{\frac{7}{15} v_{chg} i_{chg} - \frac{1}{10} v_{chg} i_{circ}\right\} \tag{14}$$

In this example, all currents are at the fundamental frequency however the currents do not need to be limited to the fundamental frequency current.

These examples show two possible approaches enabled by the structure of the onboard fast charger for transferring energy between the upper and lower charging stages.

Bi-directional power flow and grid support operations are now described below.

In some embodiments, the inverting stage may be implemented with current bidirectional two quadrant switches as opposed to single quadrant switching devices. When these switches are used, the inverting stage may invert the voltage of the AC fast charger at any phase of the fundamental grid frequency provided that the maximum expected input voltage at the differential terminals of the converter is the less than the sum of the energy storage element voltages. In the case of single inverter embodiments, the energy storage device voltage must be greater than the peak voltage under all conditions. In the case of dual inverter embodiments, the sum of the energy storage device voltages must be greater than the peak voltage under all state-of-charge conditions. This is a potential advantage for dual inverter embodiments, as a greater range of energy storage devices (e.g., safer storage devices) can be used for dual inverter embodiments as the voltage requirements are less onerous.

This implies the charger is capable of bidirectional power flow at any power factor making it suitable for grid support applications. The EV charger can now provide grid for services such as load levelling, peak shaving, frequency control, operate as a back-up power supply, etc. In addition, the system is capable of providing reactive power for grid voltage support. As an added benefit, the system is capable of fault blocking capabilities in case of grid faults.

A control strategy, according to some embodiments, is described below. The operation of the charger is controlled such that, for example, the charger is configured to enable charging of the EV battery while meeting grid requirements.

While the requirements may be met with filter components, the more lightweight solution is to control the on-board fast charger to produce voltages and currents with low distortion. Weight reduction is an important factor for consideration in the development and design of electric vehicles, as lowered weight allows for an increased driving range, or longer operation.

Figure 6:
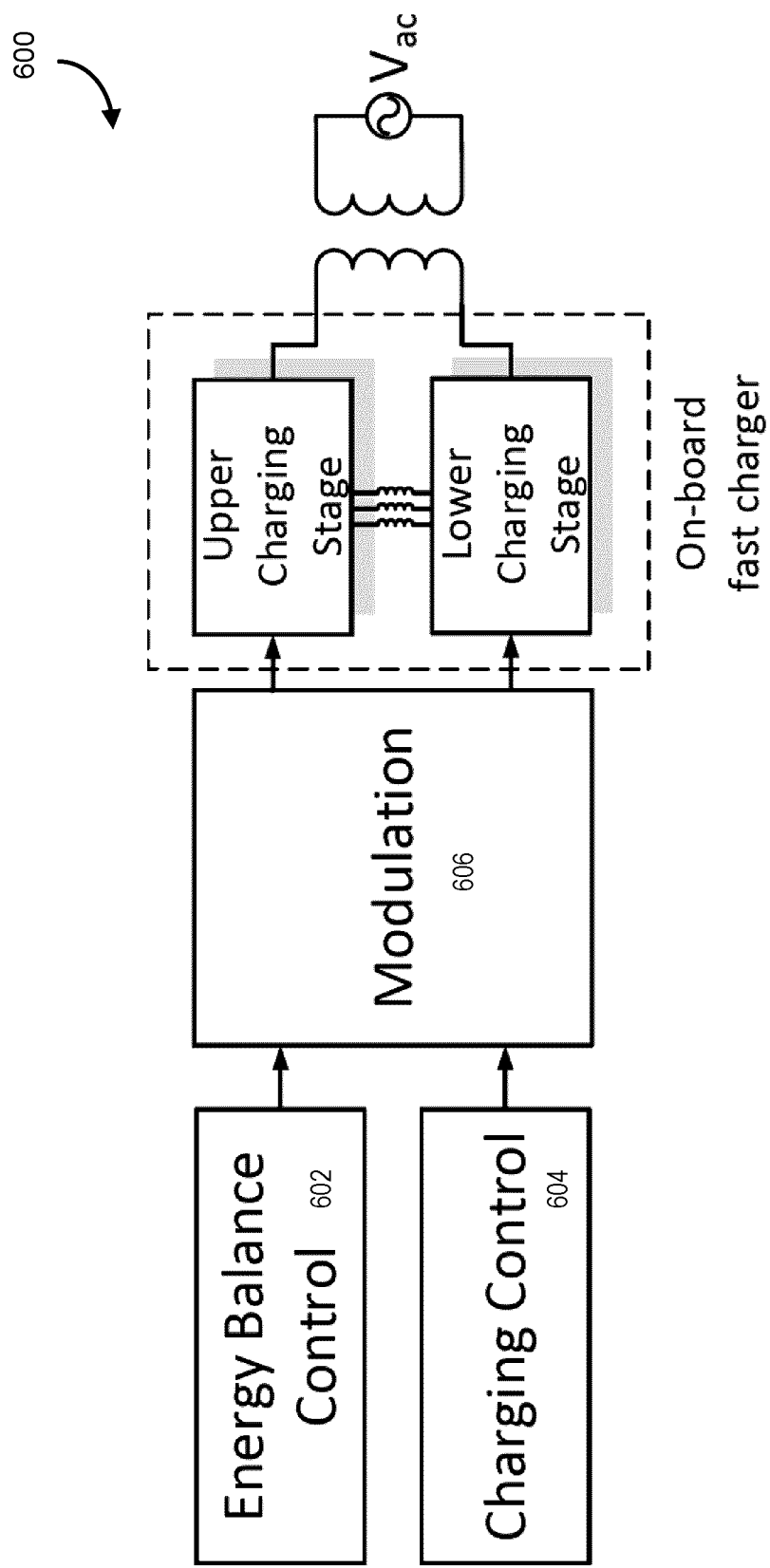
FIG. 6. Is a control diagram illustrative of an approach to control, whereby a charging controller ensure the grid current has minimal harmonics, ensures the desired power factor is achieved, and ensures the correct power is extracted from the grid, according to some embodiments. The control approach utilizes energy balance controller to control the circulation of power between the upper and lower charging stages, and a modulation block is configured to determine the gating signals that are transmitted to the upper and lower charging stages, according to some embodiments.

For the on-board fast charger, each charging stage may be considered as a bipolar voltage source, which can be used to control the AC grid current with low distortion. A high-level control scheme suitable for this purpose is shown in diagram 600 on FIG. 6. It shows a charging controller 602 and an energy balance controller 604 connected to a modulation block 606 that would be used to control the on-board fast charger.

The charging controller 602 ensures that the fundamental frequency current is regulated to meet grid code while also dividing the current equally amongst the phases of the motor. Due to the inverting stage, the controller is capable of tracking bipolar currents and therefore only tracks a current at the grid frequency.

The energy balance controller 604 internally transfers power between the upper and lower charging stages without affecting the grid voltage or current. Finally, the modulation block 606 uses input from the controller to create the necessary gating signals to produce desired waveforms as shown in FIG. 4. Alternative control methods may also be possible.

Bandwidth requirements are described below. In comparison to embodiments without the inverting stage, those embodiments would only be capable of producing unipolar voltages, and would instead have to be connected to a diode rectifier, for example.

The traction converter would operate akin to a power factor correction (PFC) converter, which tracks to a rectified sinusoidal reference to minimize distortion. This forces the converter to track frequency multiples of the fundamental grid frequency to meet grid requirements.

Figure 7B:
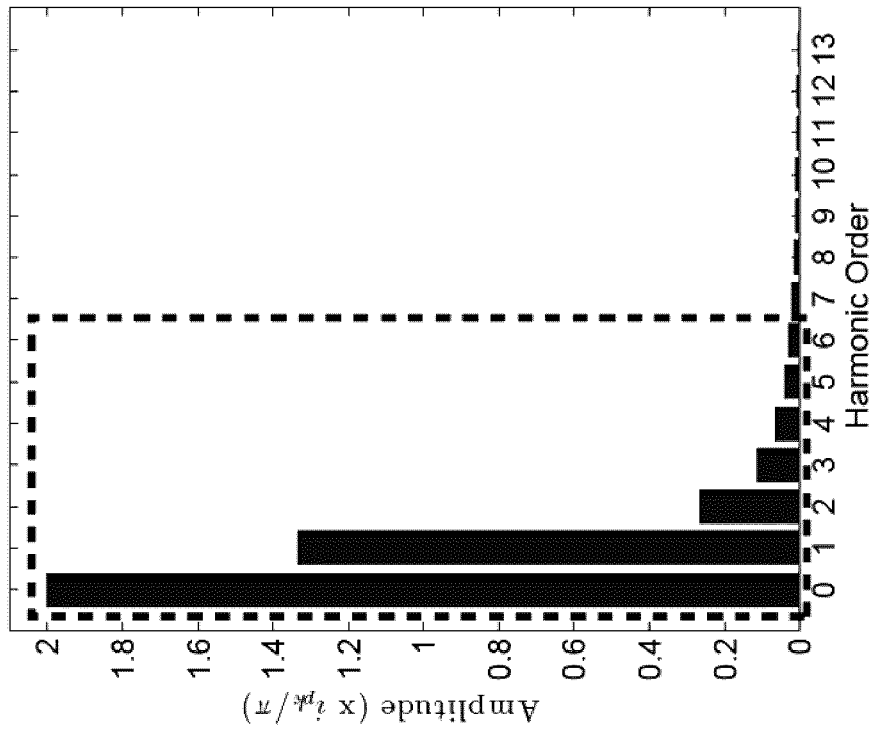
FIG. 7 is a waveform diagram of an alternate approach, illustrating a rectified current waveform and its Fourier decomposition, depicting a required control bandwidth, consisting of frequency components up to and including the 6th harmonic of the fundamental component, according to some embodiments. Some embodiments described within the specification provide easier control relative to the alternative approach of FIG. 7.
Figure 7A:
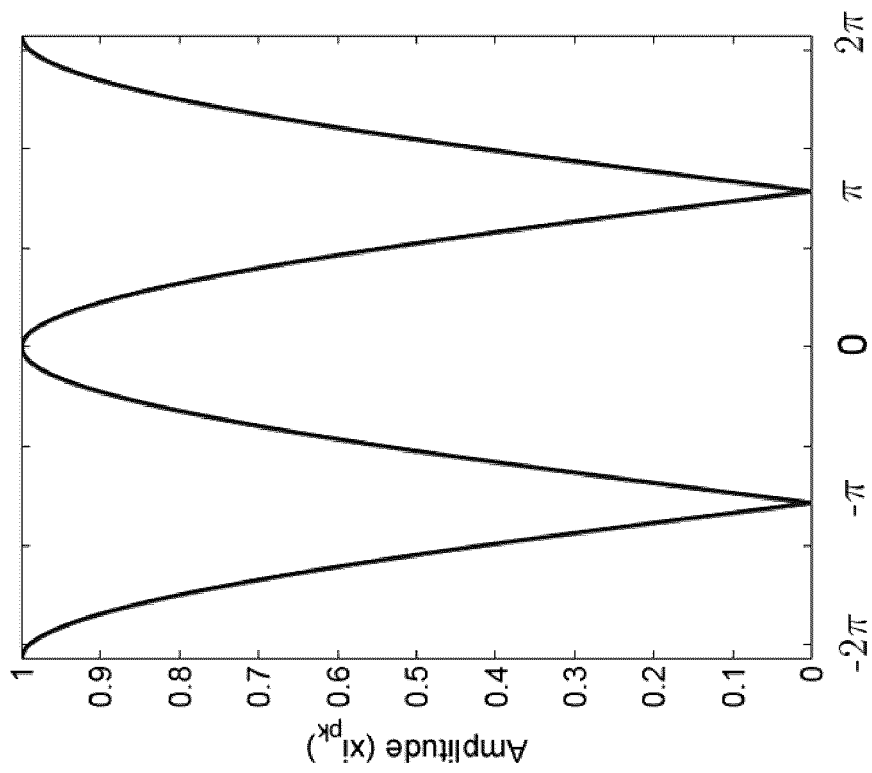

FIG. 7 and Table II show the low frequency breakdown of a rectified sinusoid. It is determined that the $6^{th}$ harmonic component reduces to approximately 2% of the fundamental component. Thus, a controller would need to track frequencies up to the $6^{th}$ harmonic of the fundamental (i.e., 720 Hz for 60 Hz grid) to sufficiently reproduce the rectified waveform. Therefore, embodiments of the proposed on-board fast charger have a lower bandwidth requirement which not only simplifies control design but lowers the minimum switching frequency requirement.

TABLE II

| Harmonic Order | Frequency (Hz) | Amplitude ($\times i_{pk}/\pi$) | % of Fundamental |
|---|---|---|---|
| 0 | 0 | 2 | — |
| 1 | 120 | 1.33 | 100 |
| 2 | 240 | 0.266 | 20 |
| 3 | 360 | 0.114 | 8.57 |
| 4 | 480 | 0.0635 | 4.76 |
| 5 | 600 | 0.0404 | 3.03 |
| 6 | 720 | 0.0279 | 2.1 |
| 7 | 840 | 0.0205 | 1.54 |
| 8 | 960 | 0.0156 | 1.18 |

Simulation Results

A detailed model of the integrated charging topology is simulated in MATLAB using the PLECS toolbox. The high-level diagram of the system is shown in FIG. 3B.

Two identical battery packs are charged from a 120V single-phase AC source via the on-board single-phase AC fast charger and drive system. In this simulation, the battery packs are replaced by ideal voltage sources. System parameters are listed in Table III.

TABLE III

Simulation Parameters

|  | Symbol | Value |
|---|---|---|
| Grid Parameters |  |  |
| Grid Voltage | $V_g$ | 120 V |
| Grid Current | $i_g$ | 11.7 A |
| Average Power | $P_{avg}$ | 1.4 kW |
| On-Board Fast Charger Parameters |  |  |
| Peak input voltage | $V_{in,pk}$ | 170 V |
| Output voltage | $V_1, V_2$ | 120 V |
| Inductor resistance | $R_s$ | 0.3Ω |
| Inductance | $L_s$ | 0.5 mH |
| Battery voltage | $V_{batt1}, V_{batt2}$ | 120 V |
| Switching frequency | $f_{sw}$ | 9 kHz |

Figure 8:
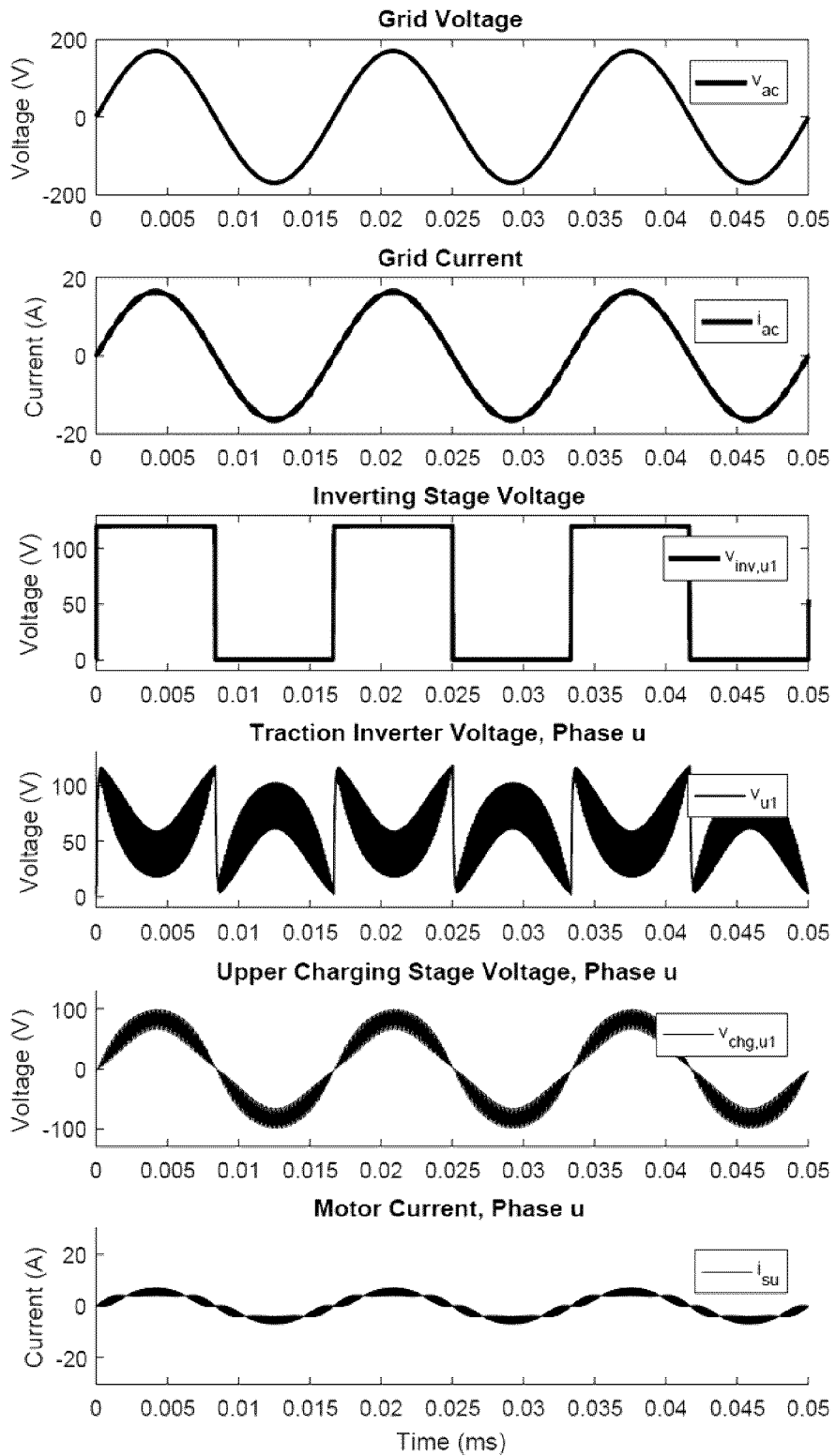
FIG. 8 includes waveform simulation results for an on-board fast charger operating at unity power factor, according to some embodiments.
Figure 14A:
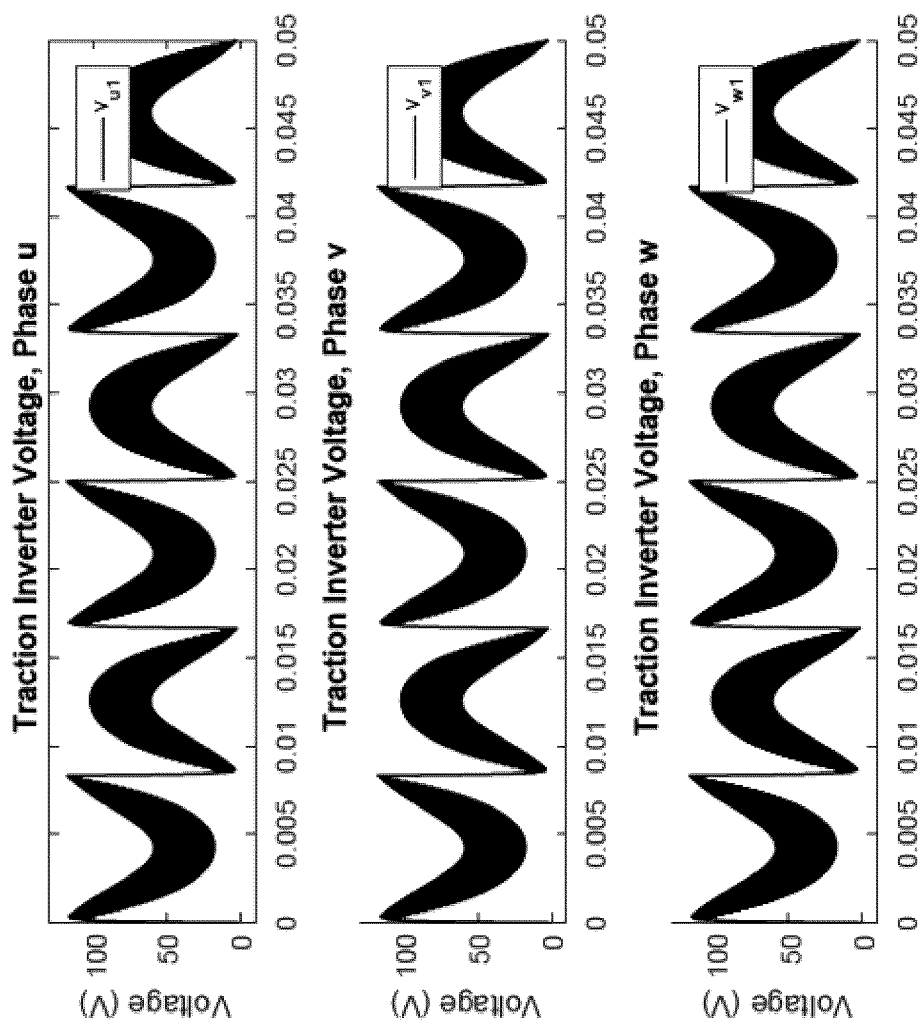
FIG. 14A, FIG. 14B, FIG. 14C are waveform diagrams illustrating that all three phase outputs, (u, v, and w) are equal in normal operation (i.e., when there is not a need to transfer energy between charging stage 1 and 2).
Figure 14B:
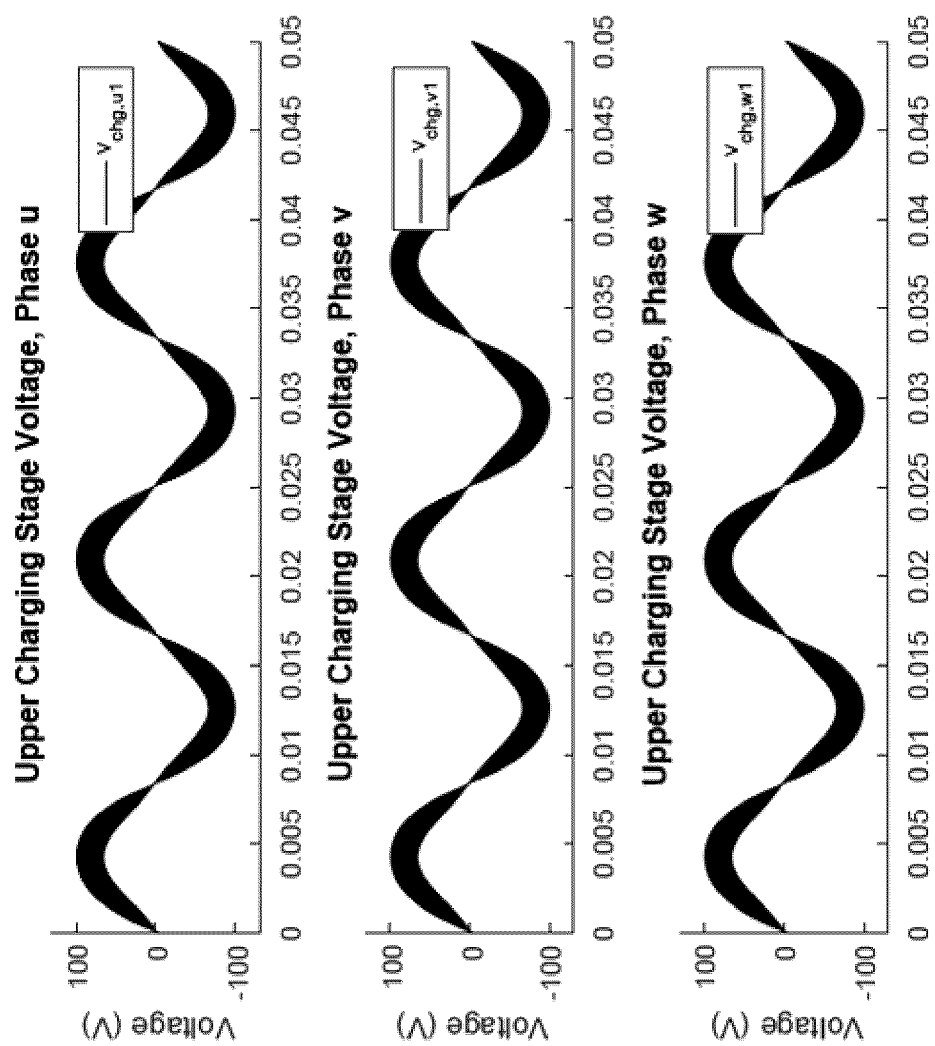
Figure 14C:
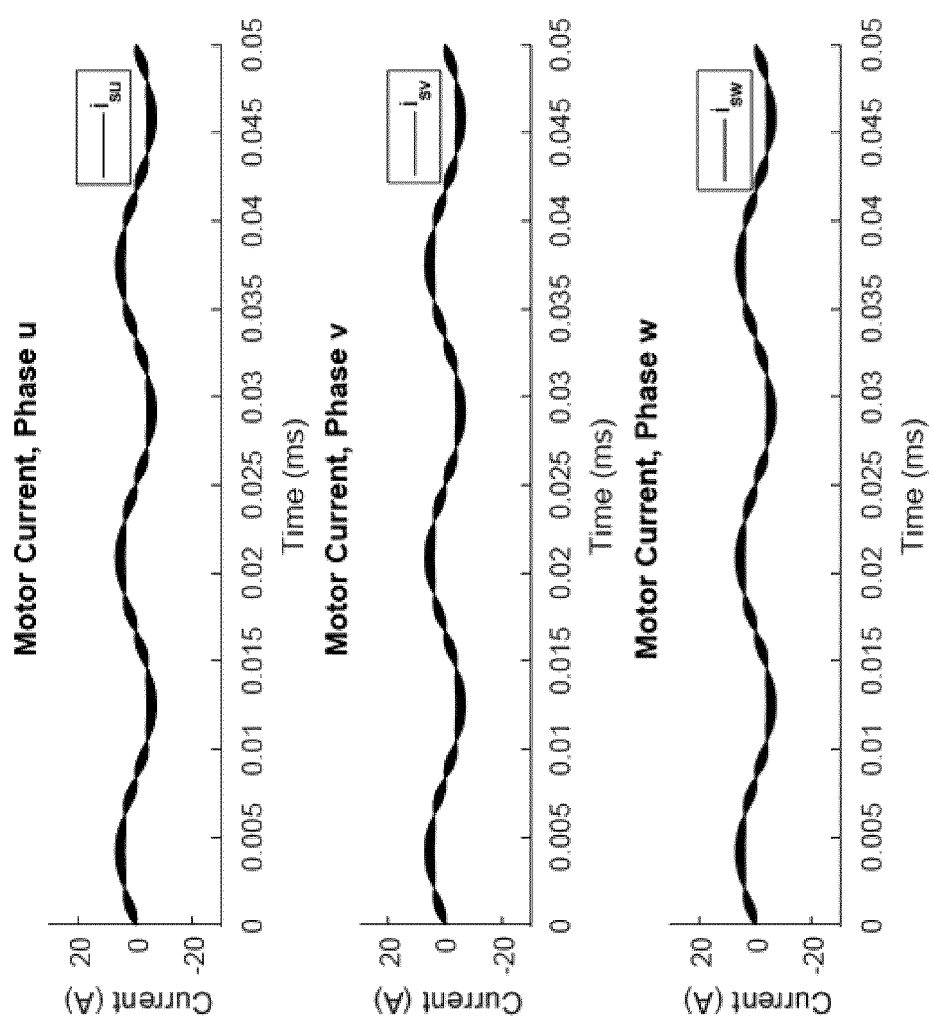

FIG. 8 shows the voltage and current quantities of the charger when operated at unity power factor. In this figure, the traction converter voltages and upper charging state voltages are filtered to show the low frequency switching components of the voltages. These figures match the ideal waveforms as shown in FIG. 4. For regular operation, all three-phases of the traction converter are equal. Hence, FIG. 8 only shows phase u voltages and currents. For reference, the other phase voltages and currents in FIG. 14A, FIG. 14B, FIG. 14C are provided to show that all phase voltages and currents are equal.

Also, as expected, the inductor currents per phase tracks approximately one-third of the input current. As such, only zero-sequence current is injected into the motor windings to ensure minimal generation of net torque during standstill charging.

Figure 9:
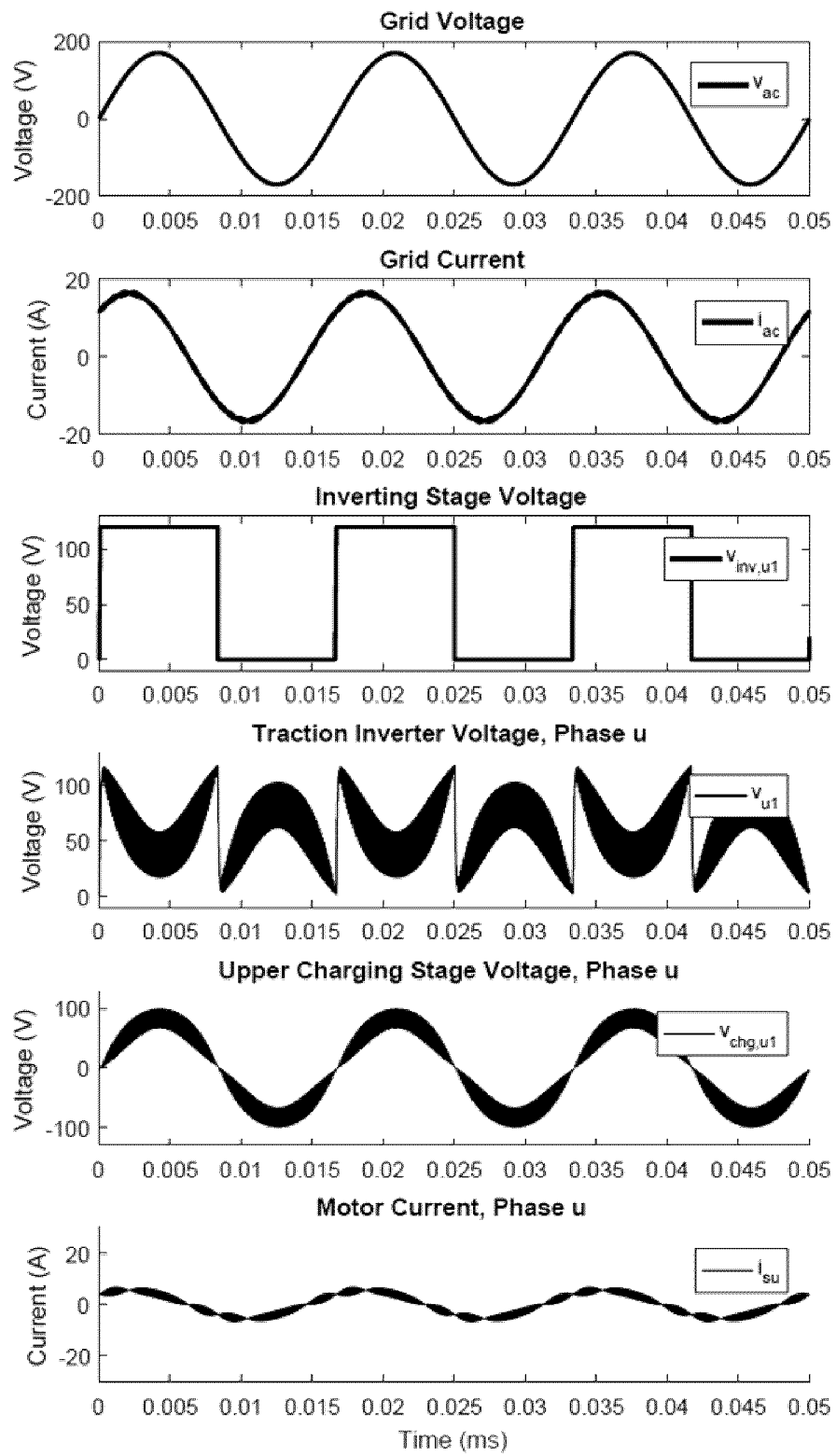
FIG. 9 includes waveform simulation results for an on-board fast charger operating at power factor 0.7 leading, according to some embodiments.

FIG. 9 shows the voltage and current quantities of the charger when operated at 0.7 power factor leading. These simulation results demonstrate the ability of the charger to operate at various power factors. Since the converter is not transferring energy between the upper and lower charging stations, all phase voltages and currents are equal and are not shown.

Figure 10:
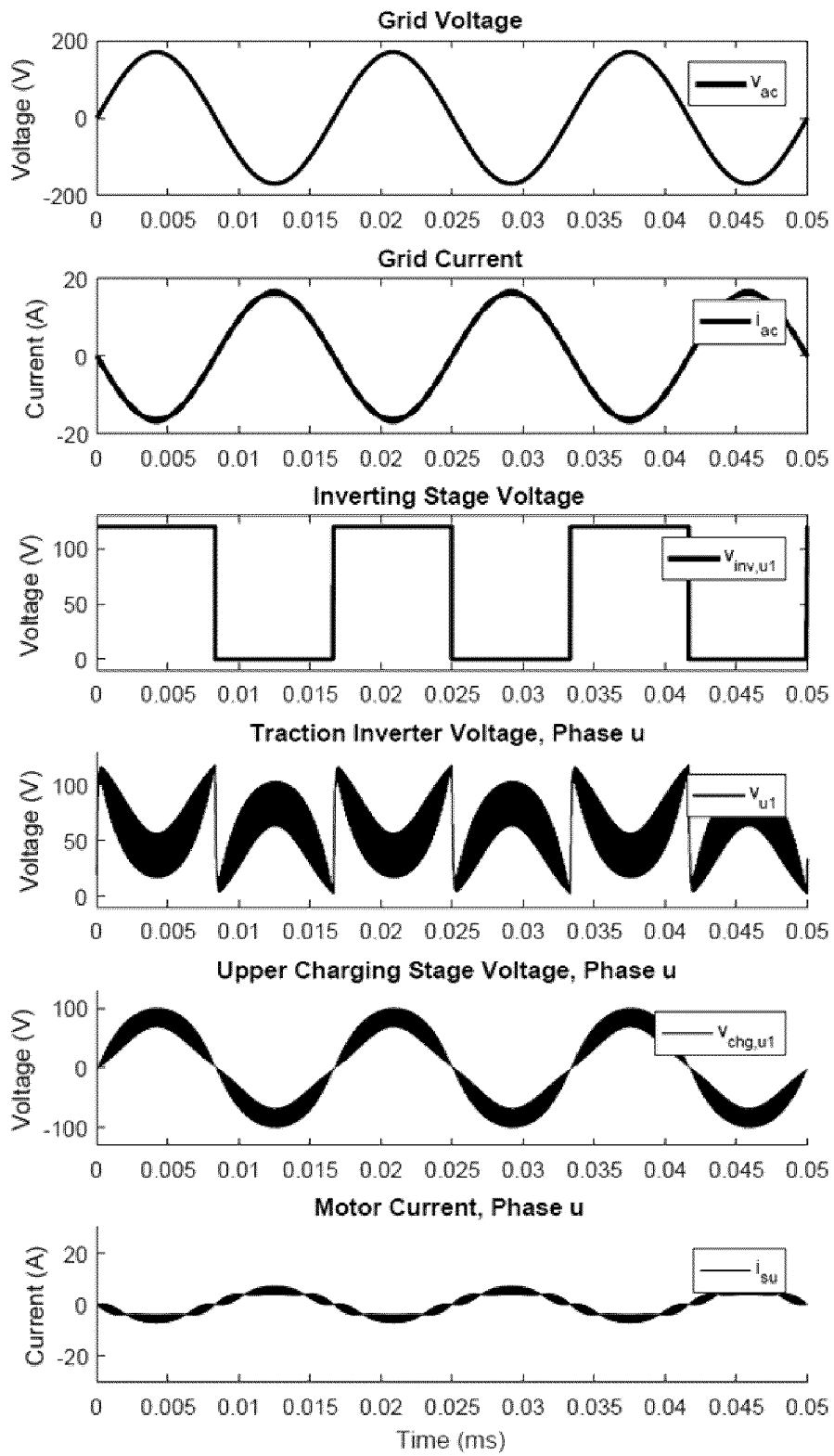
FIG. 10 includes waveform simulation results for an on-board fast charger supplying power to the grid, according to some embodiments, wherein the system is bidirectional (capable of charging and discharging the energy storage device).

In addition, the on-board fast charger can also provide power to the grid for grid support applications, which is shown in FIG. 10. These simulation results verify the bidirectional functionalities of the proposed system, in accordance with some embodiments. Since the converter is not transferring energy between the upper and lower charging stations, all phase voltages and currents are equal and are not shown.

For both single and dual-inverter drive embodiments, the total battery voltage must be greater than that of the peak AC voltage. Thus, for dual-inverter drive embodiments using identical battery packs to the single-inverter drive, the voltage range can be double that of the single-inverter.

For embodiments using the dual inverter drive, power may be transferred between battery packs as described in various embodiments.

Figure 11:
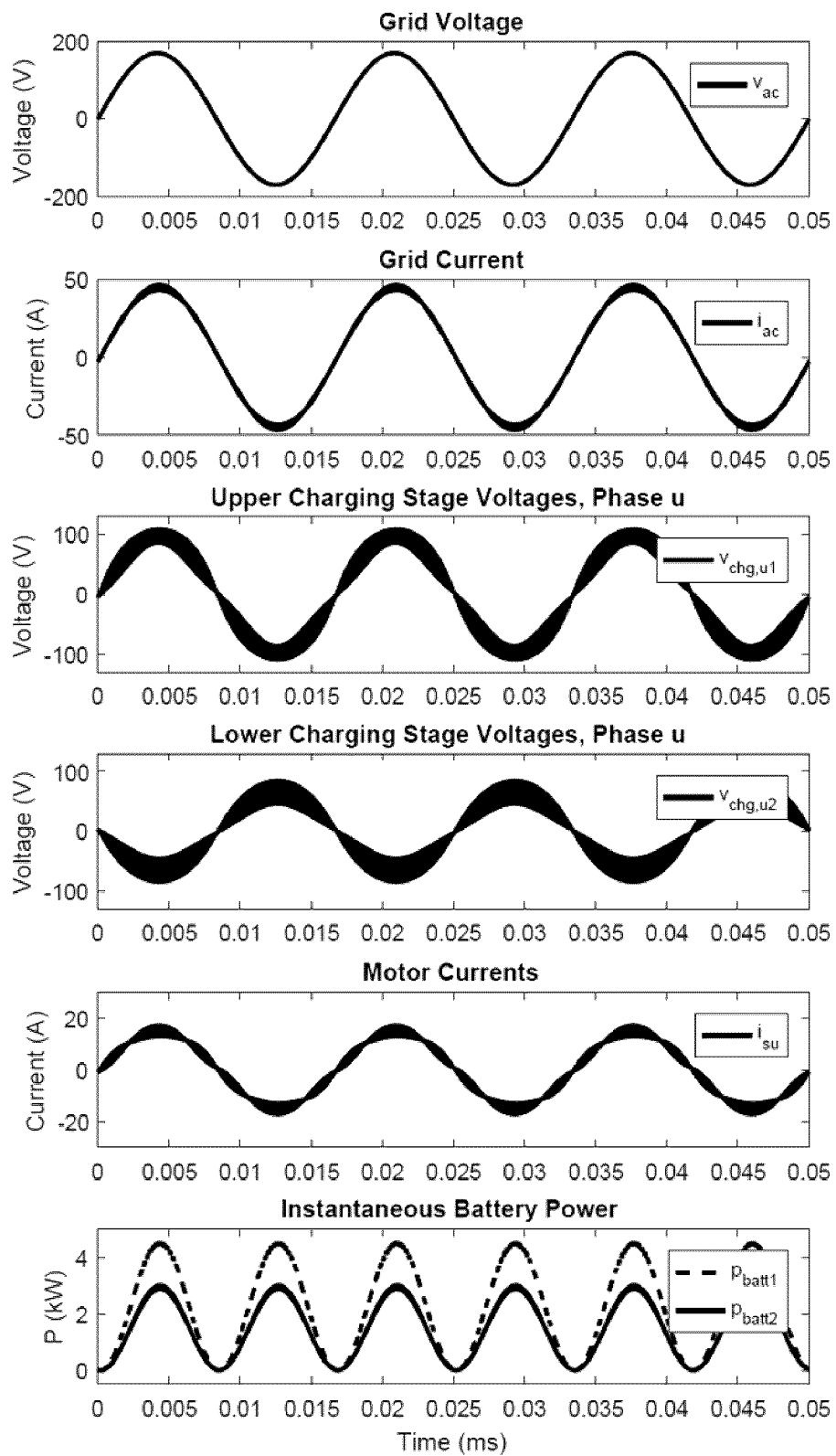
FIG. 11 includes waveform simulation results for an on-board fast charger transferring power between battery packs using voltage difference between traction converters, according to some embodiments, whereby energy balance can be achieved by changing the relative voltage between the charging stages. The upper charging stage produces 60% of the grid voltage instead of 50% as previously discussed using FIG. 4. In the case of FIG. 11, each traction converter phase carries the same current, only the voltage output by the traction converters changes. The average power plotted in the last graph shows that the average power of the upper charging stage is greater than the lower one.

FIG. 11 introduces a voltage offset between the upper and lower charging stage to charge one energy storage device over the other. This is demonstrated by the instantaneous battery power since the average value of $P_{batt1}$ is higher than $P_{batt2}$.

Figure 12A:
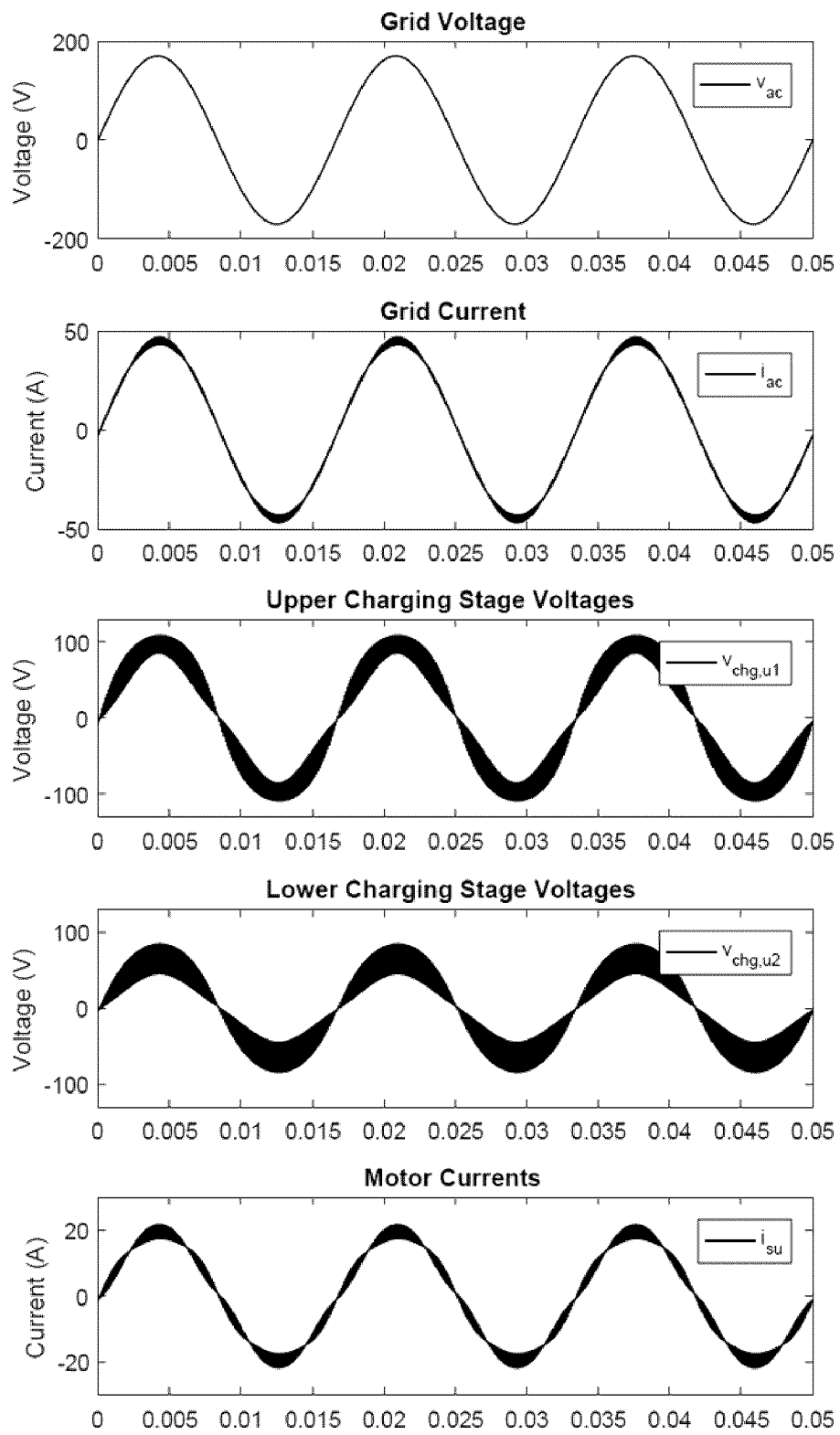
FIG. 12A, FIG. 12B, and FIG. 12C include waveform simulation results for an on-board fast charger transferring power between battery packs using circulating currents, according to some embodiments, where energy balance can be achieved by circulating currents within the machine. However, the voltages must be changed as well. In this case the currents of each phase are different, and the voltages output by each phase are also different.
Figure 12B:
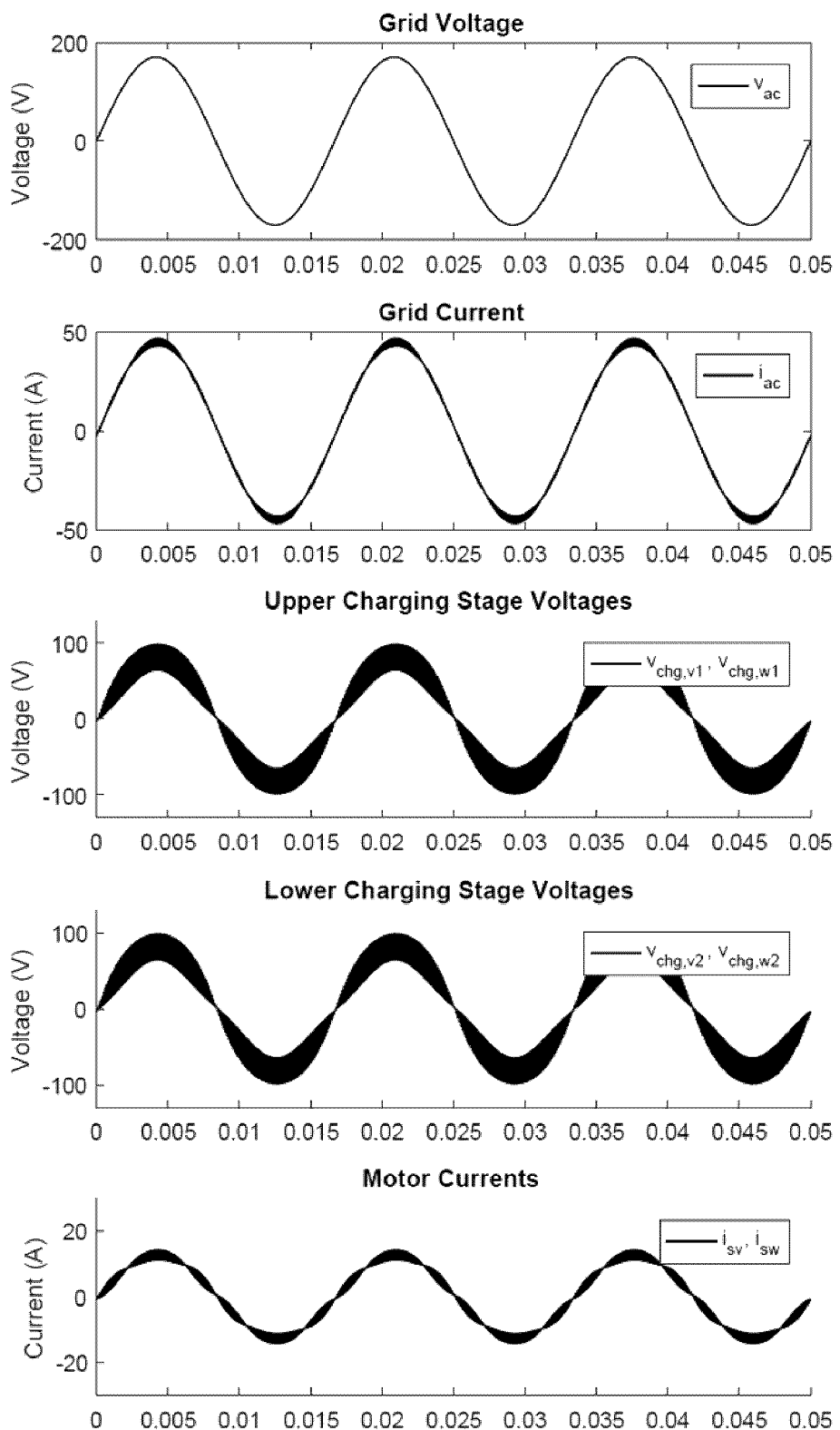
Figure 12C:
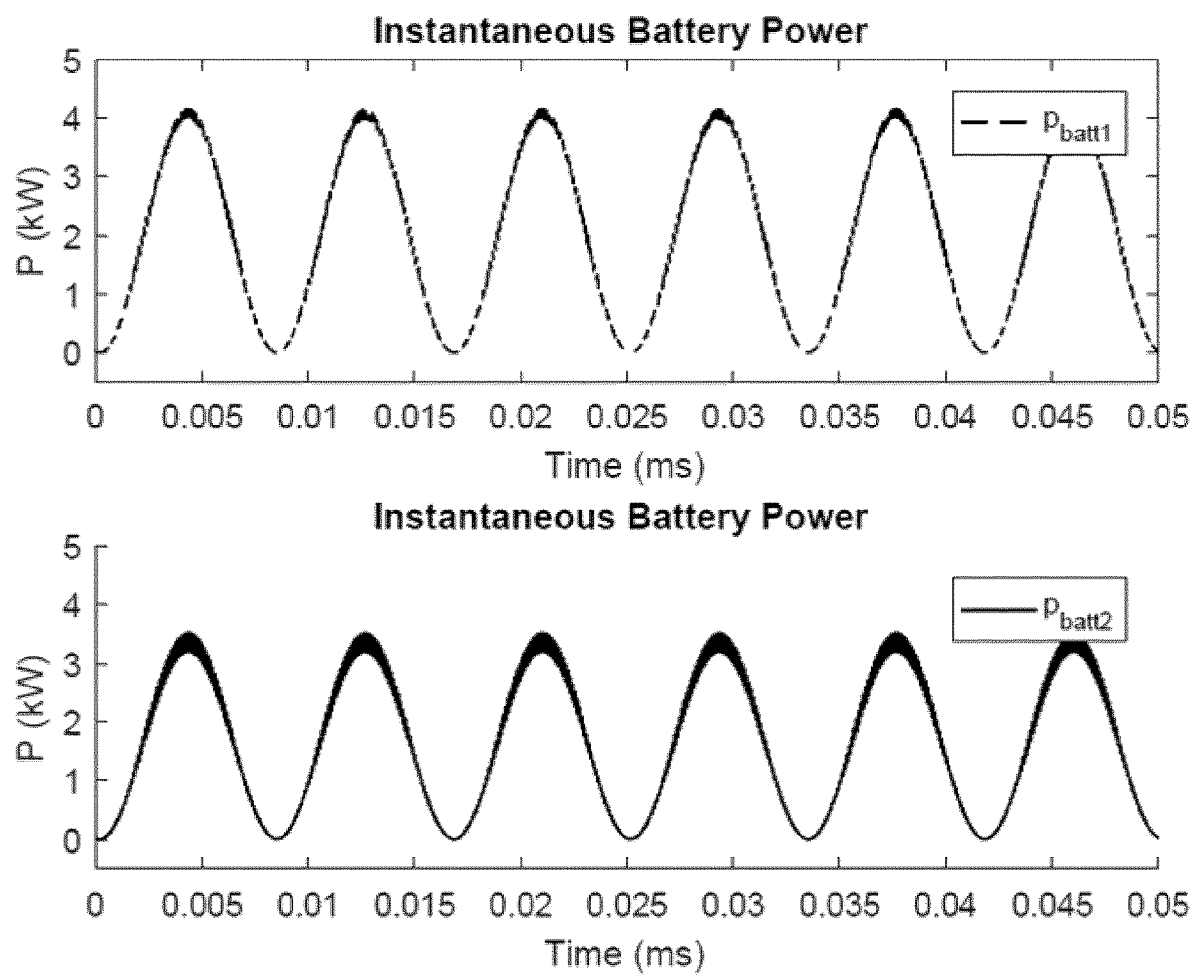

Alternatively, a circulating current may be introduced as demonstrated in FIGS. 12A-12C (e.g., as a way to balance energy storage device voltages). In contrast to a zero sequence current, a circulating current will produce a stator flux in the machine that could potentially interact with the rotor to produce torque. FIG. 12A is provided in relation to one phase, and FIG. 12B is provided in relation to the other two phases. The different amplitudes of the currents are a result of the circulating current. FIG. 12C demonstrates that a different average power enters each storage device.

The stator flux will have a fixed orientation defined by the phase current(s). The orientation of the stator flux must be set in alignment with the rotor magnetic axis to ensure no torque is generated as a result of the circulating current.

The introduction of the circulating current may be useful, for example, where the other approach does not work or has limited capacity, for example, in situations of extreme imbalance as between the voltages of the energy storage devices while simultaneously being interfaced to a relatively high voltage AC network.

This could result, for example, where heterogeneous types or media of devices are used for energy storage, such as a hybrid approach with a capacitor and a battery (one may reach a full state of charge or otherwise be unable to receive more charge and may need charge to be diverted to the other).

The net field produced by the circulating currents would be operated at an angle that is aligned to the rotor axis where no net average torque would be produced.

Figure 15:
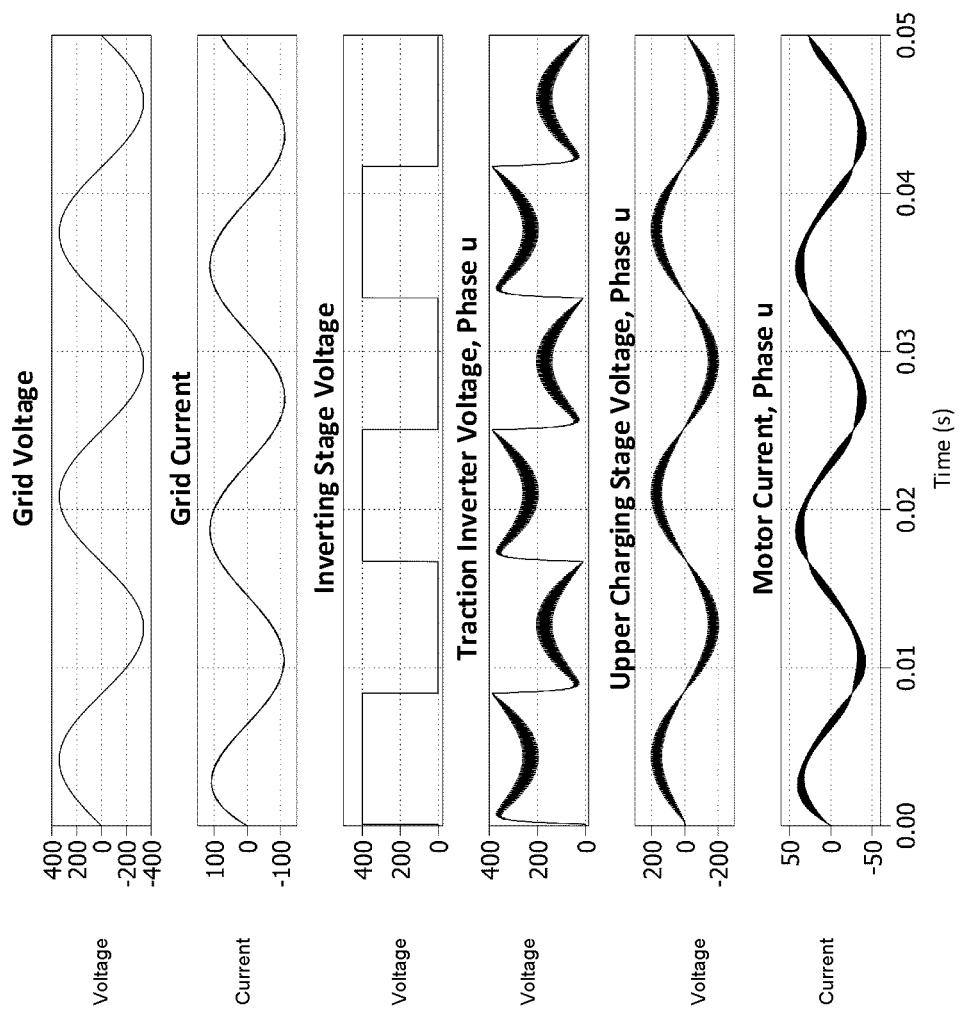
FIG. 15 includes waveform simulation results illustrating higher power charging operation at a power factor of 0.7 leading, according to some embodiments.

Simulation results at a higher power level and grid voltage are demonstrated in FIG. 15. It can be seen the operation is similar to what has been described. The system parameters for this additional simulation result is presented in Table IV.

TABLE IV

Simulation Parameters

| | Symbol | Value |
|---|---|---|
| Grid Parameters | | |
| Grid Voltage | $V_g$ | 240 V |
| Grid Current | $i_g$ | 80 A |
| Average Power | $P_{avg}$ | 19.2 kW |
| On-Board Fast Charger Parameters | | |
| Peak input voltage | $V_{in,pk}$ | 340 V |
| Output voltage | $V_1, V_2$ | 400 V |
| Inductor resistance | $R_s$ | 0.3Ω |
| Inductance | $L_s$ | 0.5 mH |
| Battery voltage | $V_{batt1}, V_{batt2}$ | 400 V |
| Switching frequency | $f_{sw}$ | 9 kHz |

Experimental Results

Figure 16:
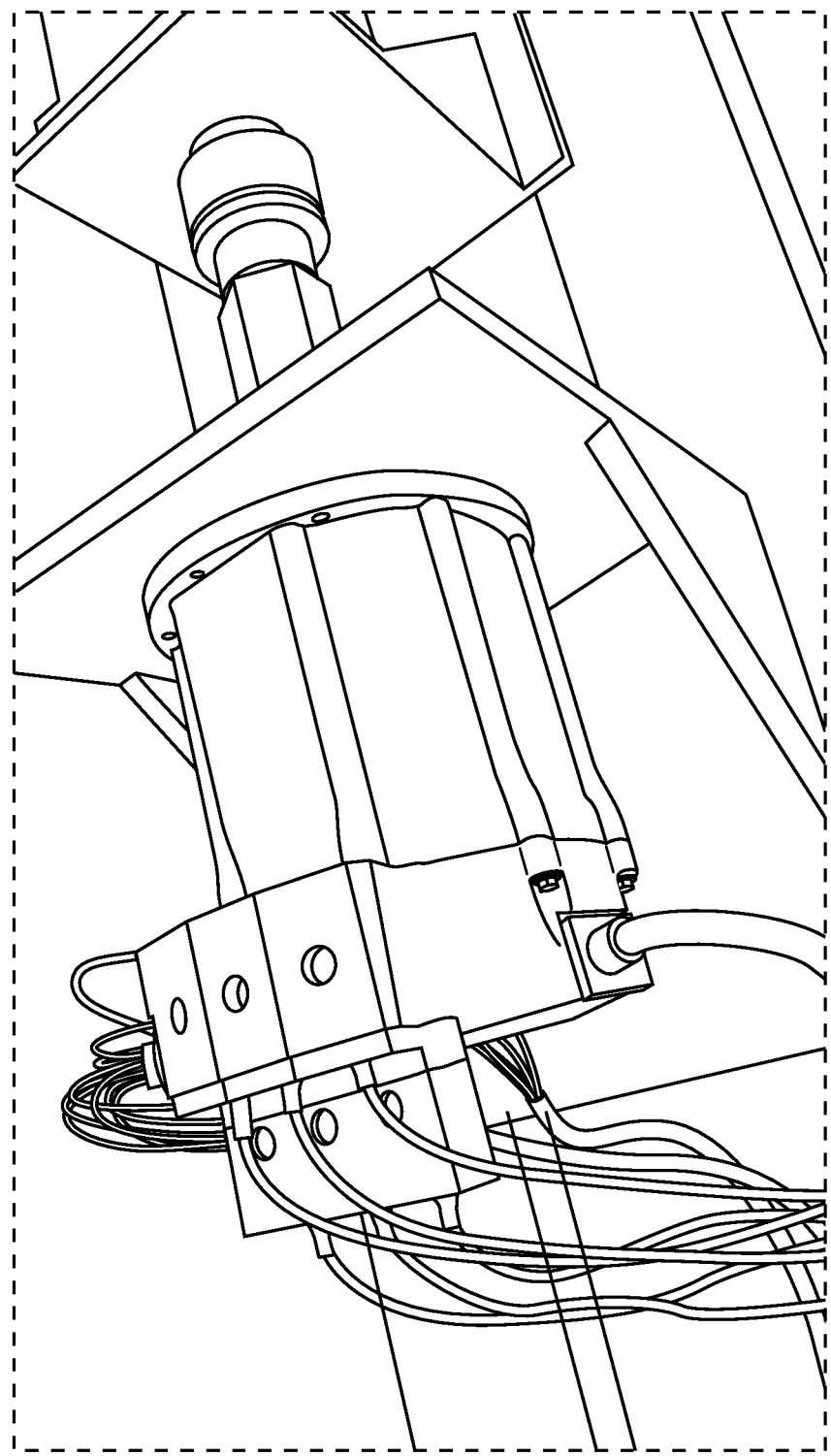
FIG. 16 is an image of a liquid cooled 110 kW machine used as part of the experimental setup, according to some embodiments.
Figure 17:
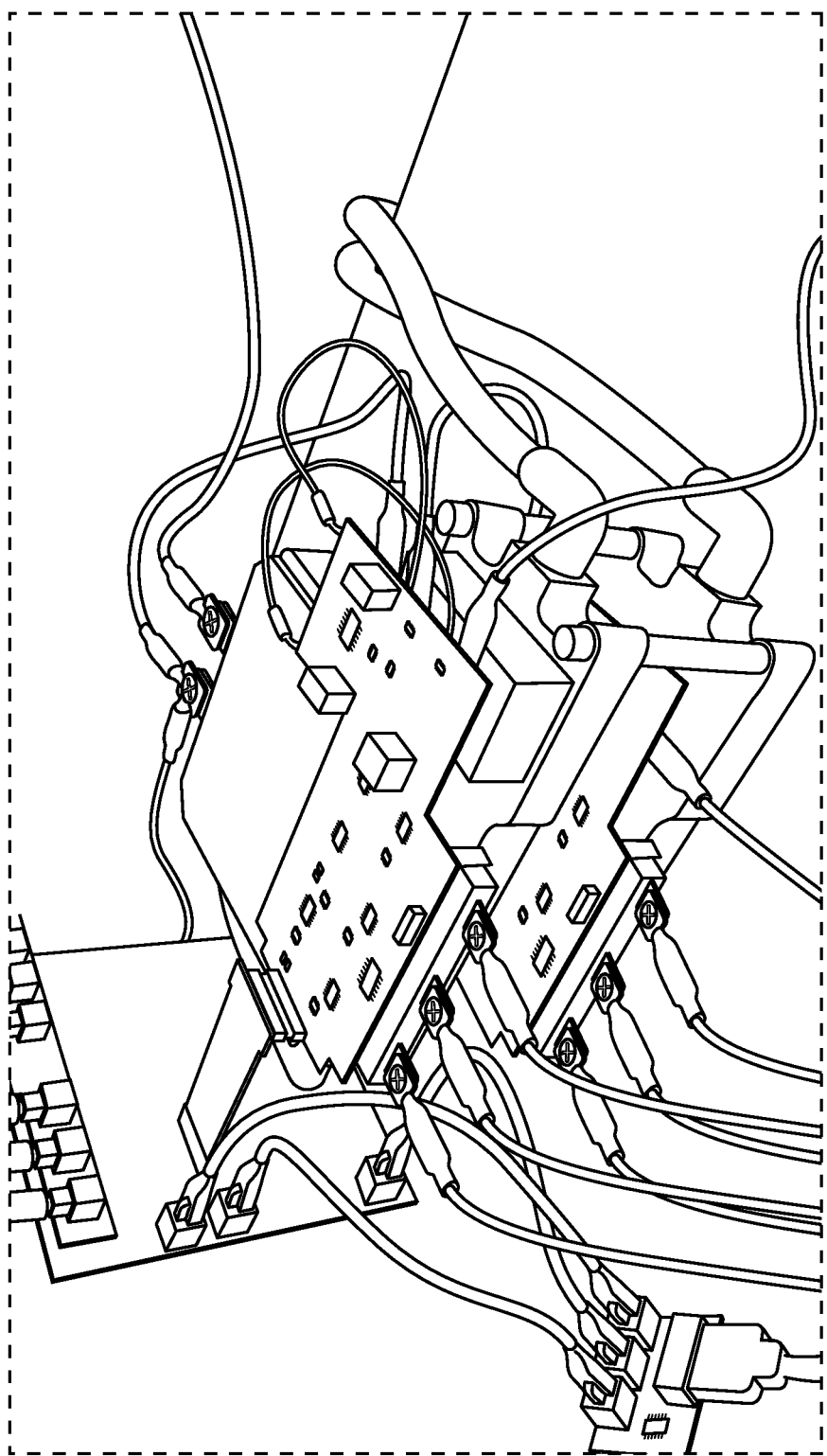
FIG. 17 is an image of a liquid cooled dual inverter drive converter featuring two charging stages, according to some embodiments.

An experimental set-up was constructed to demonstrate unity power factor operation of some embodiments. FIG. 16 and FIG. 17 are photographs showing the charging stage as well as the electric motor in this experimental set-up. A summary of the main circuit parameters for this experimental set-up are provided in Table V.

TABLE V

Experimental Circuit Parameters

| | Symbol | Value |
|---|---|---|
| Grid Parameters | | |
| Grid Voltage | $V_g$ | 120 V |
| Grid Current | $i_g$ | 14.8 A |
| Average Power | $P_{avg}$ | 1.78 kW |
| On-Board Fast Charger Parameters | | |
| Peak input voltage | $V_{in,pk}$ | 170 V |
| Output voltage | $V_1, V_2$ | 120 V |
| Inductor resistance | $R_s$ | 0.045Ω |
| Inductance | $L_s$ | 0.5 mH |
| Battery voltage | $V_{batt1}, V_{batt2}$ | 120 V |
| Switching frequency | $f_{sw}$ | 10 kHz |

Figure 18:
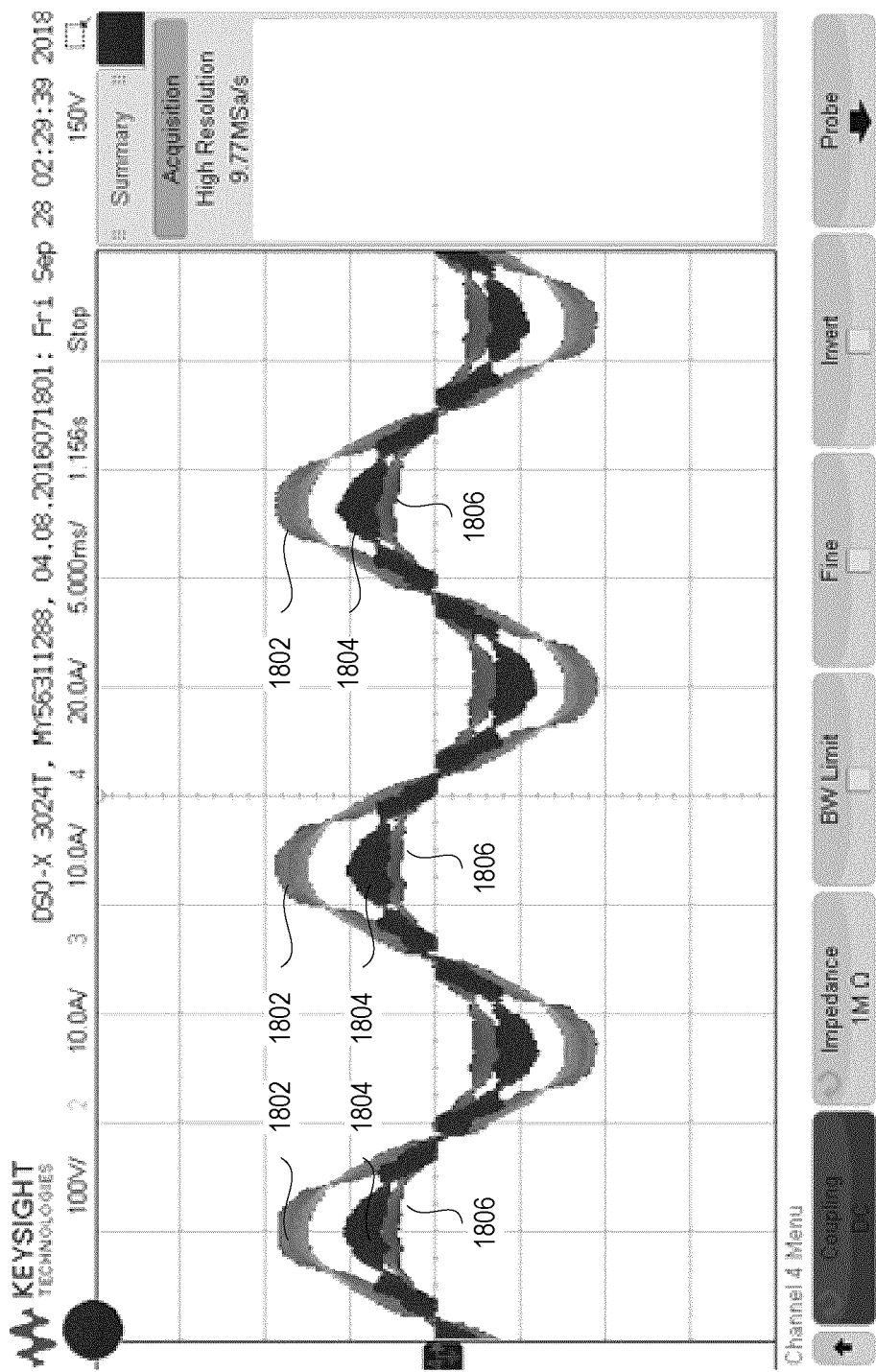
FIG. 18 is a set of experimentally obtained waveform results demonstrating charging operation at unity power factor, according to some embodiments.

FIG. 18 presents experimental waveforms captured from the system. The unity power factor operation can be directly observed as the grid current is in-phase with the input grid voltage. As it can be seen and inferred, the phase currents track exactly one-third of the grid current, and are equal, producing no net torque in the machine.

As opposed to the simulation results, it is important to note interleaved operation is not demonstrated in these experimental results. For this reason the switching frequency harmonics can be observed to be greater in magnitude than those in the corresponding simulation results. 1806 is a representative phase current, 1804 is the grid current 1802 is the grid voltage—showing the motor current is sinusoidal (not a rectified sinusoid), and it shows that the phase of the grid current 1802 is being made to be sinusoidal and in phase with the grid voltage, showing that the sinusoidal charging of 1806 is achieved with a sinusoidal motor current.

CONCLUSION

A new on-board integrated charger and drive system offering cost-effective and convenient EV charging from an AC power outlet is described. The topology and associated controls to enable single-phase on-board EV fast charging are developed and validated. When in motion, the topology operates as a drive, but when stationary the system can dynamically re-deploy the motor and traction converter to operate as part of a single-phase AC charger or a DC charger, thus presenting a cost-effective solution that utilizes the installed components of a car.

In some embodiments the proposed system can operate at any power factor and is even capable of bidirectional power flow. This allows the vehicle to be used for grid support applications, such as voltage support, frequency regulation, and peak shaving. In addition, the proposed converter has fault-blocking capabilities.

When acting as a charger, it is controlled to reduce low frequency harmonics thereby reducing infrastructure requirements to a solitary cable or cable with transformer if isolation is needed. However, in comparison to other methods of AC grid charging, the proposed system does not rely upon a diode rectifier. This implies that only a fundamental frequency current need be tracked as opposed to a rectified sinusoid thus simplifying control requirements. In comparison, the controller would have to track at minimum a 720 Hz signal as opposed to a 60 Hz signal for the proposed system.

Variants of the proposed system are described where one is based on a single inverter drive system, and another is based on a dual inverter drive system.

A benefit of the dual inverter drive system is the integration of two separate energy storage sources (i.e. batteries, supercapacitors, fuel cells or a combination thereof) where one may be better suited for power delivery and the other better suited for energy storage.

The use of two storage elements enables the use higher voltage motors to increase drivetrain efficiency without use of a single higher voltage storage element and enable higher voltage fast charging than other approaches. For dual inverter drive variant, energy transfer between the separate energy storage units is facilitated by the approaches described in various embodiments without impacting the grid.

As for application, embodiments of the proposed topology are able to accommodate all common commercial input AC voltages including 208V commercial, 277V/480V commercial (US), 240/400V (EU) and 347V/600V commercial (Canada) when charging.

The proposed topology of some embodiments' charging rate is limited by thermal constraints of the motor and traction power electronics, thus highlighting an ability to charge the vehicle directly from existing grid infrastructure and scaling charging capabilities with the drivetrain system.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both electronic hardware and software. These embodiments may be implemented on programmable computers or other electronic control systems, such as control mechanisms for timing or otherwise controlling operation of switches, transistors, among others.

Where software is utilized to generate control signals, program code is applied to input data. Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. An electric vehicle fast charger adapted for re-using magnetic components of one or more motors of an electric vehicle having one or more traction converters having one or more traction converter switches that are not in use when the electric vehicle is stationary, the electric vehicle fast charger comprising:
    a pair of differential terminals configured for coupling to a power grid providing a grid voltage having a waveshape and frequency, the pair of differential terminals carrying a grid current between the power grid and the electric vehicle fast charger;
    one or more sensors coupled to the power grid to track the waveshape and the frequency of the grid voltage being provided by the power grid;
    one or more sets of switches coupled to the power grid through the differential terminals and coupled to a corresponding energy storage device of one or more energy storage devices, each set of switches including at least one of: current uni-directional switches or current bi-directional two quadrant switches;
    the one or more energy storage devices, each coupled to a corresponding set of switches of the one or more sets of switches and coupled to a corresponding traction converter of the one or more traction converters; and
    a switching controller configured for generating gating signals for:
        controlling the switches of the one or more sets of switches to (i) operate at the frequency of the grid voltage to conduct inversion of the grid current at the frequency of the grid voltage, or (ii) operate at a higher frequency than the frequency of the grid voltage to conduct current shaping of the grid current to rectify the grid current to approximate the waveshape of the grid voltage; and
        controlling the one or more traction converter switches to (i) operate at the frequency of the grid voltage to conduct inversion of the grid current at the frequency of the grid voltage, or (ii) operate at a higher frequency than the frequency of the grid voltage to conduct current shaping to rectify the grid current to approximate the waveshape of the grid voltage;
    wherein at least one of the switches of the one or more set of switches and the one or more traction converter switches provides inversion and at least one of the switches of the one or more set of switches and the one or more traction converter switches provides current shaping.

2. The electric vehicle fast charger of claim 1, wherein the switching controller is further configured for determining which of the switches of the one or more set of switches or the one or more traction converter switches provides inversion.

3. The electric vehicle fast charger of claim 1, wherein the switching controller is further configured for monitoring operational characteristics of the electric vehicle fast charger and the determining which of the switches of the one or more set of switches or the one or more traction converter switches provides inversion is dynamically conducted based at least on the monitored operational characteristics.

4. The electric vehicle fast charger of claim 1, wherein the switching controller is further configured for monitoring operational characteristics of the electric vehicle fast charger and the determining which of: the switches of the one or more set of switches or the one or more traction converter switches provides current shaping is dynamically conducted based at least on the monitored operational characteristics.

5. The electric vehicle fast charger of claim 1, wherein the one or more sets of switches includes two sets of switches;

wherein the one or more energy storage devices includes two energy storage devices; wherein the one or more traction converters includes two traction converters; and wherein each of set of switches is associated with a corresponding energy storage device and a corresponding traction converter.

6. The electric vehicle fast charger of claim 5, wherein each operating voltage of the two energy storage devices is less than the grid voltage.

7. The electric vehicle fast charger of claim 5, wherein each of the one or more sets of switches are operated at different modulation carrier phase shifts to reduce harmonics.

8. The electric vehicle fast charger of claim 5, wherein each of the switches corresponding to each of the two traction converters are operated to at different modulation carrier phase shifts to reduce harmonics.

9. The electric vehicle fast charger of claim 5, comprising an energy storage device monitoring circuit configured for monitoring charge levels of the energy storage devices, and upon detecting an imbalance of the charge levels between energy storage devices, causing the switching controller to apply a modulation bias such that over time, the charge levels of the energy storage devices becomes balanced.

10. The electric vehicle fast charger of claim 5, comprising an energy storage device monitoring circuit configured for monitoring charge levels of the energy storage devices, and upon detecting an imbalance of the charge levels between energy storage devices, causing the switching controller to introduce a circulating current between motor phases of the traction converters such that over time, the charge levels of the energy storage devices becomes balanced.

11. A method for re-using magnetic components of one or more motors of an electric vehicle having one or more traction converters having one or more traction converter switches that are not in use when the electric vehicle is stationary, the method comprising:

coupling the electric vehicle to a power grid, the power grid providing a grid voltage having a waveshape and frequency to establish a grid current between the power grid and the electric vehicle, the coupling across one or more sets of switches that are coupled to a corresponding energy storage device of one or more energy storage devices each coupled to a corresponding set of switches of the one or more sets of switches and coupled to a corresponding traction converter of the one or more traction converters;

tracking the waveshape and the frequency of the grid voltage being provided by the power grid; and generating a first set of gating signals for controlling the switches of the one or more sets of switches to (i) operate at the frequency of the grid voltage to conduct inversion of the grid current at the frequency of the grid voltage, or (ii) operate at a higher frequency than the frequency of the grid voltage to conduct current shaping to rectify the grid current to approximate the waveshape of the grid voltage; and generating a second set of gating signals for controlling the one or more traction converter switches to (i) operate at the frequency of the grid voltage to conduct inversion of the grid current at the frequency of the grid voltage, or (ii) operate at a higher frequency than the frequency of the grid voltage to conduct current shaping to rectify the grid current to approximate the waveshape of the grid voltage;

wherein at least one of the switches of the one or more set of switches and the one or more traction converter switches provides inversion and at least one of the switches of the one or more set of switches and the one or more traction converter switches provides current shaping.

12. The method of claim 11, comprising determining which of the switches of the one or more set of switches or the one or more traction converter switches provides inversion.

13. The method of claim 11, comprising monitoring operational characteristics of the electric vehicle; and dynamically assigning which of the switches of (i) the one or more set of switches or (ii) the one or more traction converter switches provides inversion based at least on the monitored operational characteristics.

14. The method of claim 11, comprising monitoring operational characteristics of the electric vehicle; and dynamically assigning which of the switches of (i) the one or more set of switches or (ii) the one or more traction converter switches provides shaping based at least on the monitored operational characteristics.

15. The method of claim 11, wherein the one or more sets of switches includes two sets of switches;

wherein the one or more energy storage devices includes two energy storage devices; wherein the one or more traction converters includes two traction converters; and wherein each of set of switches is associated with a corresponding energy storage device and a corresponding traction converter.

16. The method of claim 15, wherein each operating voltage of the two energy storage devices is less than the grid voltage.

17. The method of claim 15, wherein each switch of the one or more sets of switches are operated at different modulation carrier phase shifts to reduce harmonics.

18. The method of claim 15, wherein each of the switches corresponding to each of the two traction converters are operated to at different modulation carrier phase shifts to reduce harmonics.

19. The method of claim 15, comprising monitoring charge levels of the energy storage devices, and upon detecting an imbalance of the charge levels between energy storage devices, causing application of a modulation bias such that over time, the charge levels of the energy storage devices becomes balanced.

20. A non-transitory machine readable medium, storing machine interpretable instructions, which when executed, cause a processor or a configurable circuit to perform steps of a method for re-using magnetic components of one or more motors of an electric vehicle having one or more traction converters having one or more traction converter switches that are not in use when the electric vehicle is stationary, the method comprising:

coupling the electric vehicle to a power grid, the power grid providing a grid voltage having a waveshape and frequency to establish a grid current between the power grid and the electric vehicle, the coupling across one or more sets of switches that are coupled to a corresponding energy storage device of one or more energy storage devices each coupled to a corresponding set of switches of the one or more sets of switches and coupled to a corresponding traction converter of the one or more traction converters;

tracking the waveshape and the frequency of the grid voltage being provided by the power grid;

generating a first set of gating signals for controlling the switches of the one or more sets of switches to (i) operate at the frequency of the grid voltage to conduct inversion of the grid current at the frequency of the grid voltage, or (ii) operate at a higher frequency than the frequency of the grid voltage to conduct current shaping to rectify the grid current to approximate the waveshape of the grid voltage; and generating a second set of gating signals for controlling the one or more traction converter switches to (i) operate at the frequency of the grid voltage to conduct inversion of the grid current at the frequency of the grid voltage, or (ii) operate at a higher frequency than the frequency of the grid voltage to conduct current shaping to rectify the grid current to approximate the waveshape;

wherein at least one of the switches of the one or more set of switches and the one or more traction converter switches provides inversion and at least one of the switches of the one or more set of switches and the one or more traction converter switches provides current shaping.

\* \* \* \* \*